United States Patent
Kim et al.

(10) Patent No.: US 11,985,565 B2
(45) Date of Patent: May 14, 2024

(54) METHOD AND APPARATUS FOR MOBILITY MANAGEMENT IN WIRELESS COMMUNICATION SYSTEM

(71) Applicant: LG Electronics Inc., Seoul (KR)

(72) Inventors: Hongsuk Kim, Seoul (KR); Youngdae Lee, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 341 days.

(21) Appl. No.: 17/414,492

(22) PCT Filed: Jan. 16, 2020

(86) PCT No.: PCT/KR2020/000760
§ 371 (c)(1),
(2) Date: Jun. 16, 2021

(87) PCT Pub. No.: WO2020/149650
PCT Pub. Date: Jul. 23, 2020

(65) Prior Publication Data
US 2022/0070752 A1    Mar. 3, 2022

(30) Foreign Application Priority Data

Jan. 16, 2019  (KR) .................. 10-2019-0005844
Jan. 16, 2019  (KR) .................. 10-2019-0005916

(51) Int. Cl.
*H04W 36/32* (2009.01)
*H04W 24/08* (2009.01)
*H04W 36/00* (2009.01)

(52) U.S. Cl.
CPC ........... *H04W 36/32* (2013.01); *H04W 24/08* (2013.01); *H04W 36/0058* (2018.08)

(58) Field of Classification Search
CPC .. H04W 36/32; H04W 36/0058; H04W 24/08
See application file for complete search history.

(56) References Cited

U.S. PATENT DOCUMENTS

2013/0188499 A1 *  7/2013  Mach ................... H04W 48/20
                                                   370/252
2015/0382254 A1   12/2015  Pakniat et al.
(Continued)

OTHER PUBLICATIONS

LG Electronics Inc., "Mobility Enhancement using MR Triggering," R2-1812582, 3GPP TSG-RAN WG2 Meeting #103, Gothenburg, Sweden, Aug. 20-24, 2018, 5 pages.
(Continued)

*Primary Examiner* — Won Tae C Kim
(74) *Attorney, Agent, or Firm* — Fish & Richardson P.C.

(57) ABSTRACT

The present disclosure relates to mobility management in wireless communications. According to an embodiment of the present disclosure, a method performed by a wireless device in a wireless communication system comprises: receiving mobility commands of candidate cells, mobility conditions for the candidate cells, and information for a timer; determining a first target cell among the candidate cells which satisfies a mobility condition for the first target cell; after determining the first target cell, determining a second target cell among the candidate cells which satisfies a mobility condition for the second target cell while the timer is running, wherein a priority of the second target cell is higher than a priority of the first target cell; and performing a mobility to the second target cell based on a mobility command of the second target cell.

14 Claims, 20 Drawing Sheets

(56) References Cited

U.S. PATENT DOCUMENTS

| | | | |
|---|---|---|---|
| 2016/0088529 A1 | 3/2016 | Yoon | |
| 2016/0088539 A1* | 3/2016 | Zingler | H04W 74/0833 |
| | | | 455/436 |
| 2016/0302118 A1* | 10/2016 | Yiu | H04W 36/22 |
| 2019/0223073 A1* | 7/2019 | Chen | H04W 76/18 |
| 2021/0314833 A1* | 10/2021 | Hao | H04W 36/00837 |
| 2022/0201561 A1* | 6/2022 | Bin Redhwan | H04W 36/0061 |

OTHER PUBLICATIONS

Vivo, "Signaling procedure for conditional handover," R2-1816334, 3GPP TSG-RAN WG2 Meeting #104, Spokane, USA, Nov. 12-16, 2018, 6 pages.

\* cited by examiner

METHOD AND APPARATUS FOR MOBILITY MANAGEMENT IN WIRELESS COMMUNICATION SYSTEM

CROSS-REFERENCE TO RELATED APPLICATIONS

This application is a National Stage application under 35 U.S.C. § 371 of International Application No. PCT/KR2020/000760, filed on Jan. 16, 2020, which claims the benefit of Korean Patent Application No. 10-2019-0005844, filed on Jan. 16, 2019 and Korean Application No. 10-2019-0005916, filed on Jan. 16, 2019. The disclosures of the prior applications are incorporated by reference in their entirety.

BACKGROUND OF THE DISCLOSURE

Field of the Disclosure

The present disclosure relates to mobility management in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. To provide proper services to the wireless device, the network should manage a mobility of the wireless device, and the wireless device should perform a mobility to another cell according to the mobility management. The mobility may comprise a handover. Further, in a dual connectivity (DC) situation, the mobility may further comprise a secondary node (SN) change and/or SN addition. The mobility should be performed to a proper target cell which can provide service to the wireless device as well as possible.

SUMMARY OF THE DISCLOSURE

Technical Problem

An aspect of the present disclosure is to provide method and apparatus for mobility management in a wireless communication system.

Another aspect of the present disclosure is to provide method and apparatus for priority-based conditional mobility procedure in a wireless communication system.

Another aspect of the present disclosure is to provide method and apparatus for target cell reselection in conditional mobility in a wireless communication system.

Another aspect of the present disclosure is to provide method and apparatus for conditional mobility in consideration of a service type in a wireless communication system.

Technical Solution

According to an embodiment of the present disclosure, a method performed by a wireless device in a wireless communication system comprises: receiving mobility commands of candidate cells, mobility conditions for the candidate cells, and information for a timer; determining a first target cell among the candidate cells which satisfies a mobility condition for the first target cell; after determining the first target cell, determining a second target cell among the candidate cells which satisfies a mobility condition for the second target cell while the timer is running, wherein a priority of the second target cell is higher than a priority of the first target cell; and performing a mobility to the second target cell based on a mobility command of the second target cell.

According to an embodiment of the present disclosure, a wireless device in a wireless communication system comprises: a transceiver; a memory; and at least one processor operatively coupled to the transceiver and the memory, and configured to: control the transceiver to receive mobility commands of candidate cells, mobility conditions for the candidate cells, and information for a timer, determine a first target cell among the candidate cells which satisfies a mobility condition for the first target cell, after determining the first target cell, determine a second target cell among the candidate cells which satisfies a mobility condition for the second target cell while the timer is running, wherein a priority of the second target cell is higher than a priority of the first target cell, and perform a mobility to the second target cell based on a mobility command of the second target cell.

According to an embodiment of the present disclosure, a processor for a wireless device in a wireless communication system is configured to control the wireless device to perform operations comprising: receiving mobility commands of candidate cells, mobility conditions for the candidate cells, and information for a timer; determining a first target cell among the candidate cells which satisfies a mobility condition for the first target cell; after determining the first target cell, determining a second target cell among the candidate cells which satisfies a mobility condition for the second target cell while the timer is running, wherein a priority of the second target cell is higher than a priority of the first target cell; and performing a mobility to the second target cell based on a mobility command of the second target cell.

According to an embodiment of the present disclosure, a computer-readable medium having recorded thereon a program for performing each step of a method on a computer is provided. The method comprises: receiving mobility commands of candidate cells, mobility conditions for the candidate cells, and information for a timer; determining a first target cell among the candidate cells which satisfies a mobility condition for the first target cell; after determining the first target cell, determining a second target cell among the candidate cells which satisfies a mobility condition for the second target cell while the timer is running, wherein a priority of the second target cell is higher than a priority of the first target cell; and performing a mobility to the second target cell based on a mobility command of the second target cell.

Advantageous Effect

The present disclosure can have various advantageous effects.

For example, by performing a conditional mobility to a target cell in consideration of cell priority, UE can be served by a cell with high signal quality and high priority. Since the cell priority is related to UE's status or preference, the UE's status or preference can also be considered according to various embodiments of the present disclosure. Further, since a suitable cell with high signal quality and high priority is selected as a target cell for mobility, the rate of mobility failure or configuration failure can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
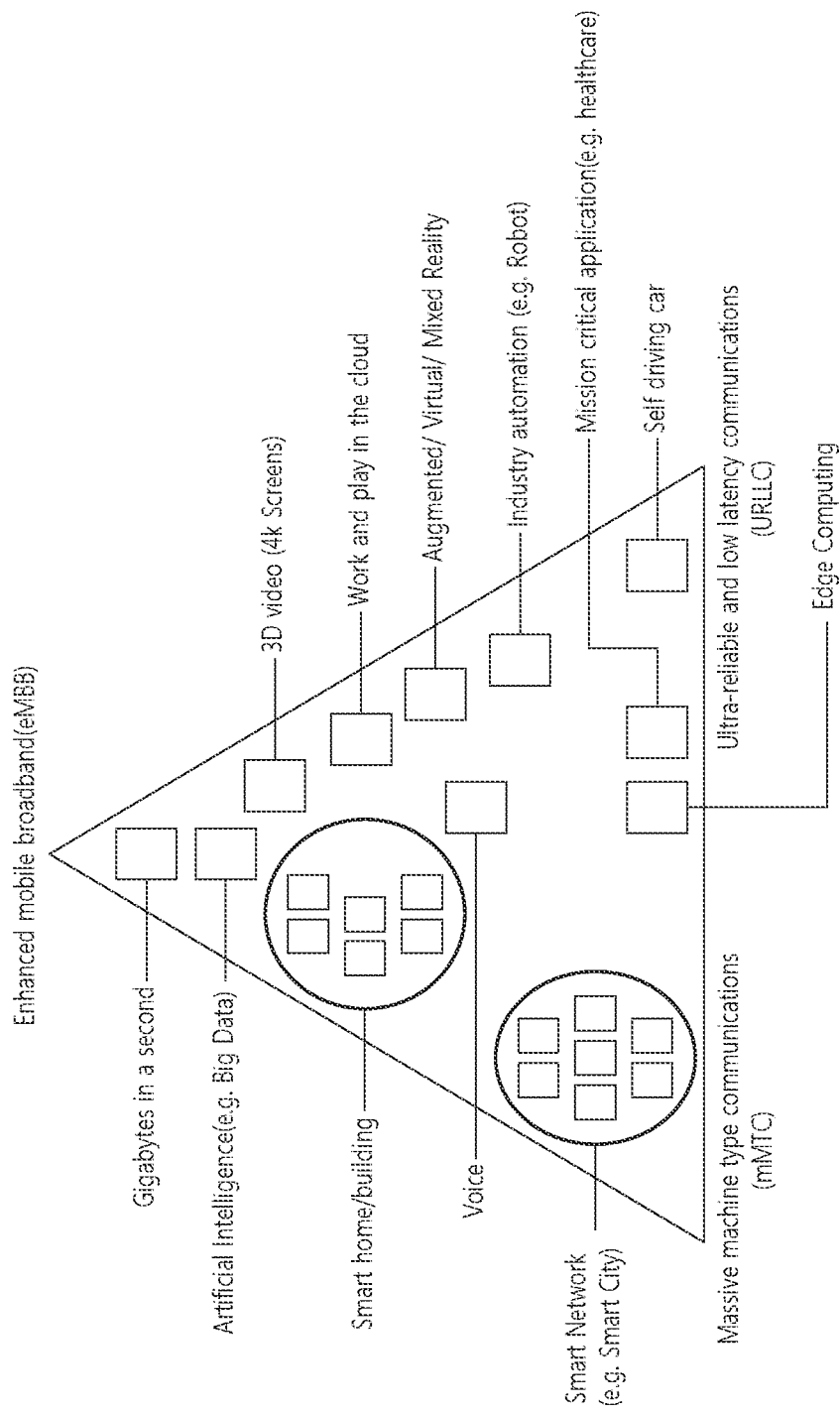
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying RRC reconfiguration parameters in the mobility command of the target cell. Further, RRC reconfiguration and RRC connection reconfiguration may be used interchangeably.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of an event, time-to-trigger (TTT), offset value, or threshold value(s). The mobility condition for an event may be satisfied if an entering condition for the event is satisfied for at least the TTT. For example, the entering condition for event A3 may be satisfied if a signal quality for a target cell is better than that for a source cell more than or equal to the offset value. For another example, the entering condition for event A5 may be satisfied if a signal quality for a target cell is better than a neighbor cell threshold and a signal quality for a source cell is lower than a serving cell threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying RRC reconfiguration parameters in the conditional mobility command of the target cell which satisfies a mobility condition for the target cell among the plurality of candidate target cells.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, descriptions regarding handover may be also applied to mobility.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
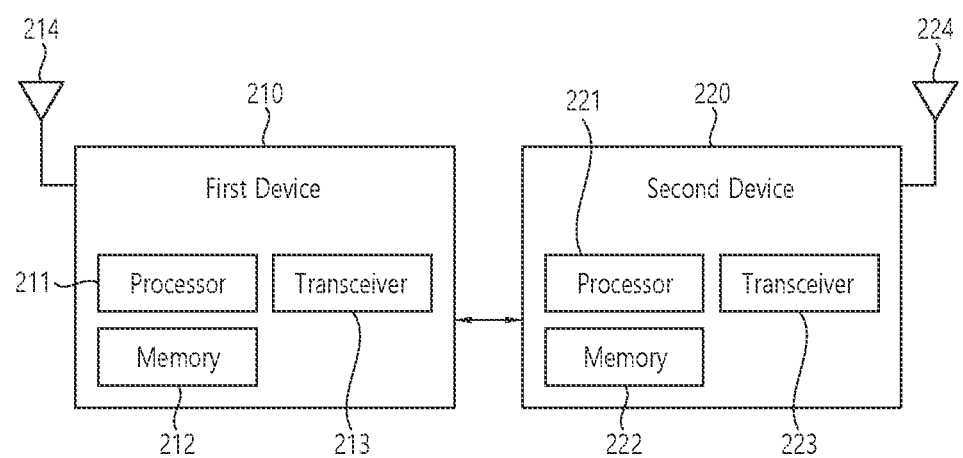
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
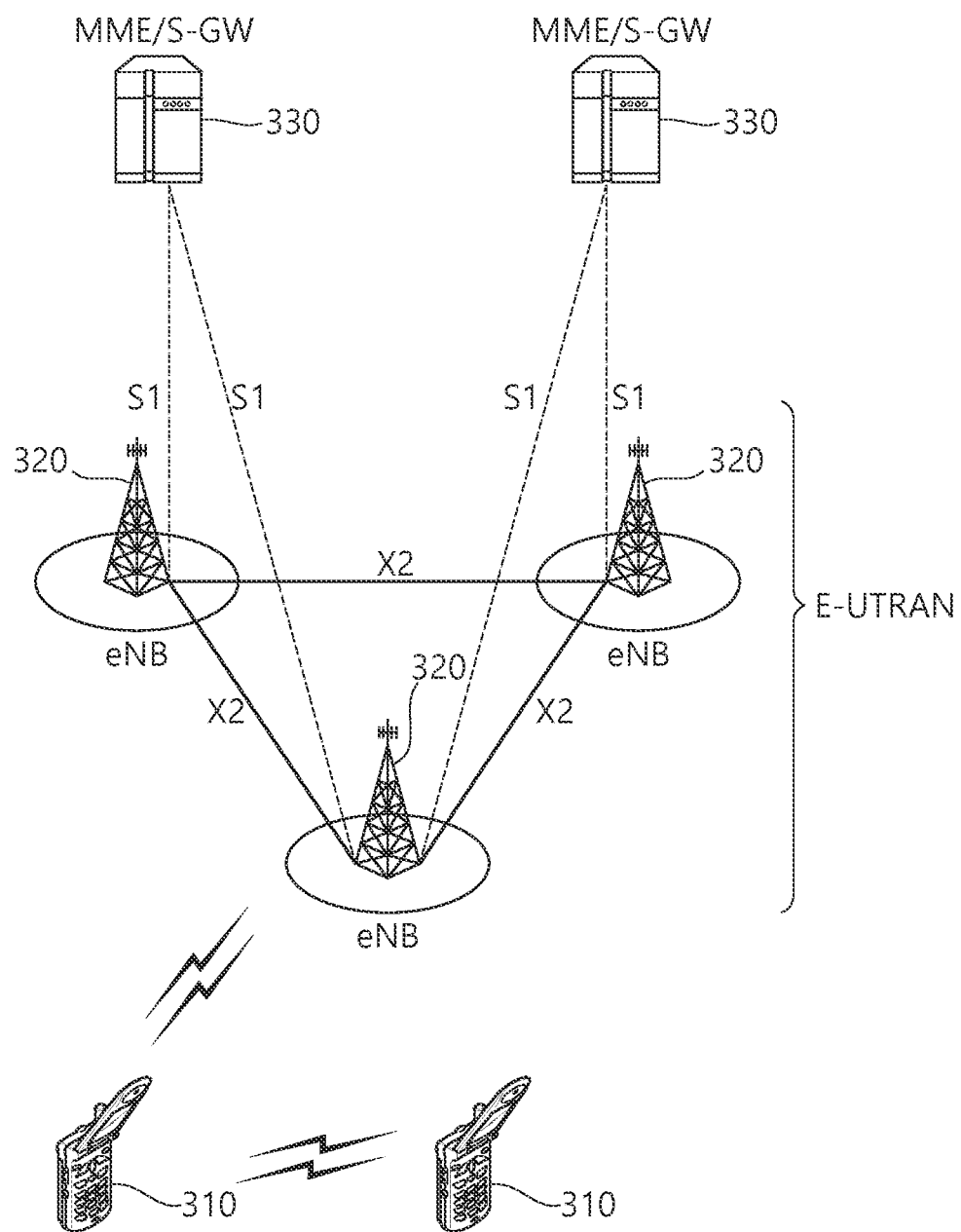
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
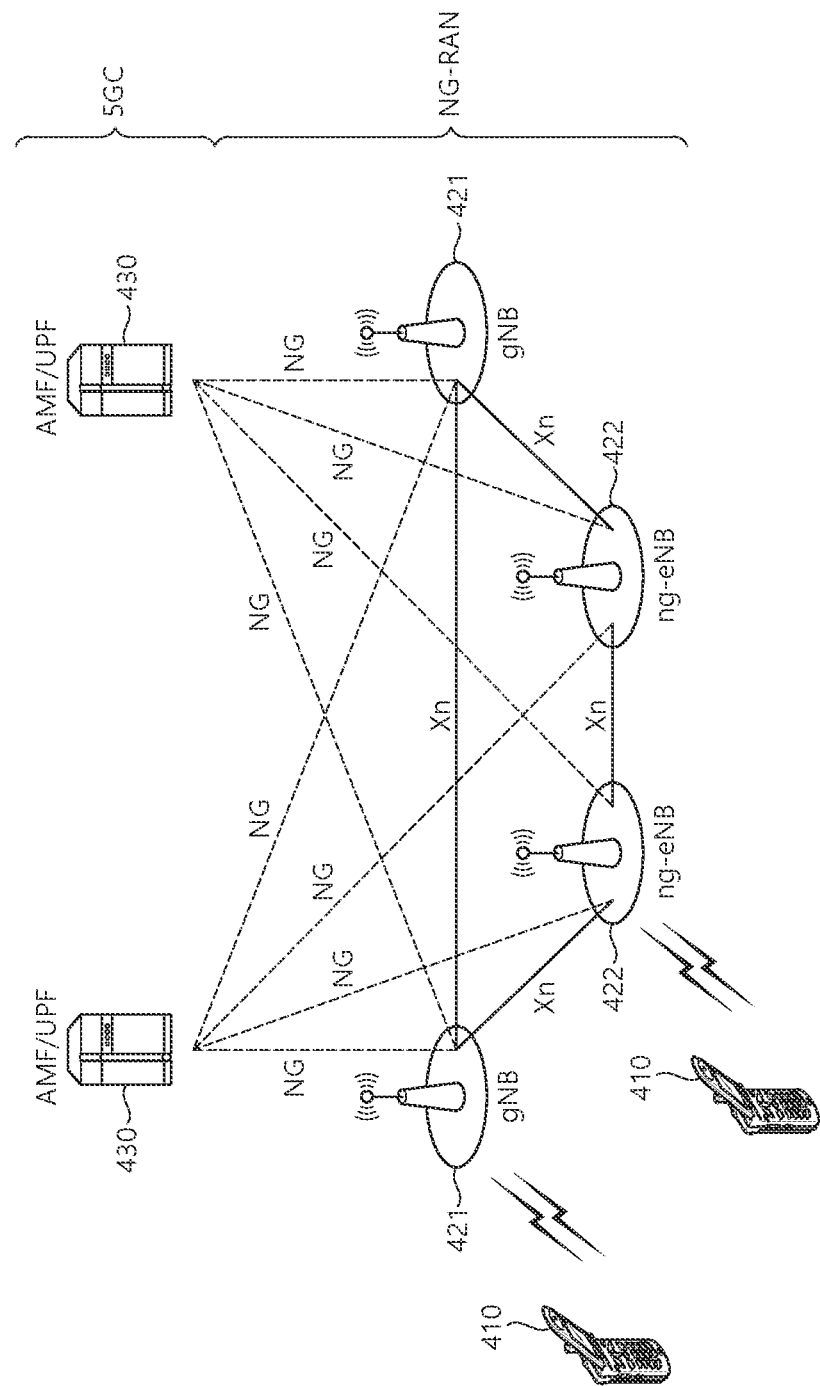
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
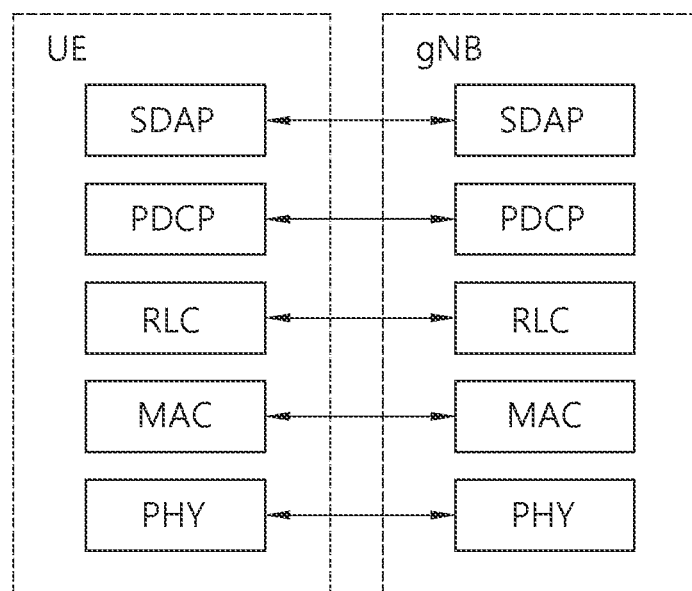
FIG. 5 shows a block diagram of a user plane protocol stack to which the technical features of the present disclosure can be applied.
Figure 6:
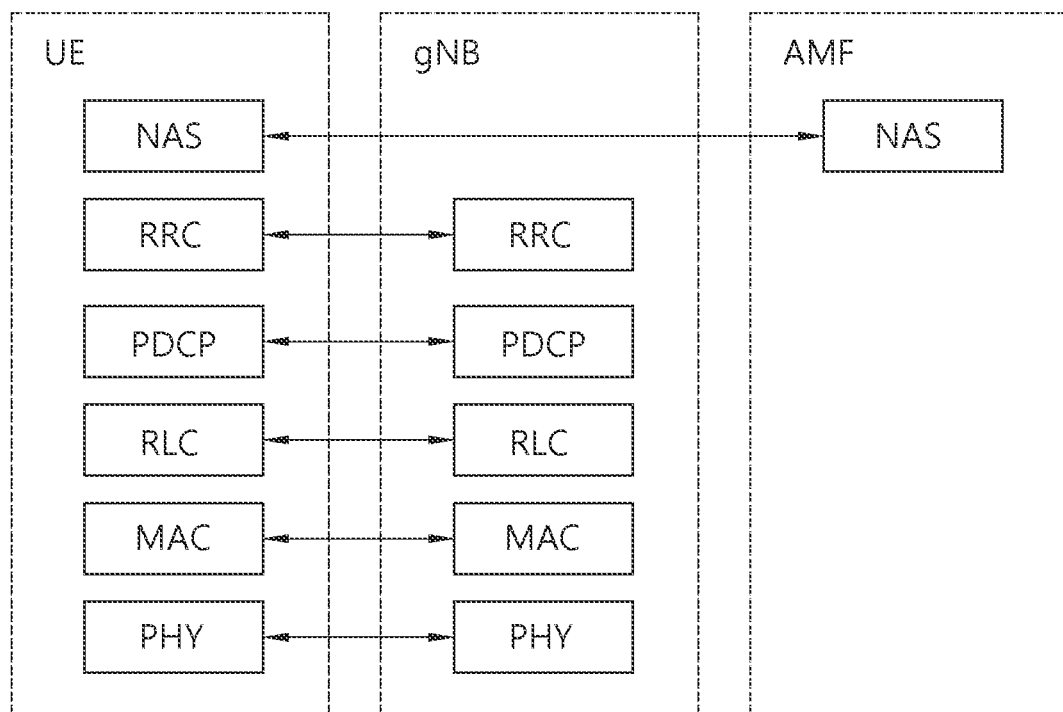
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell reselection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
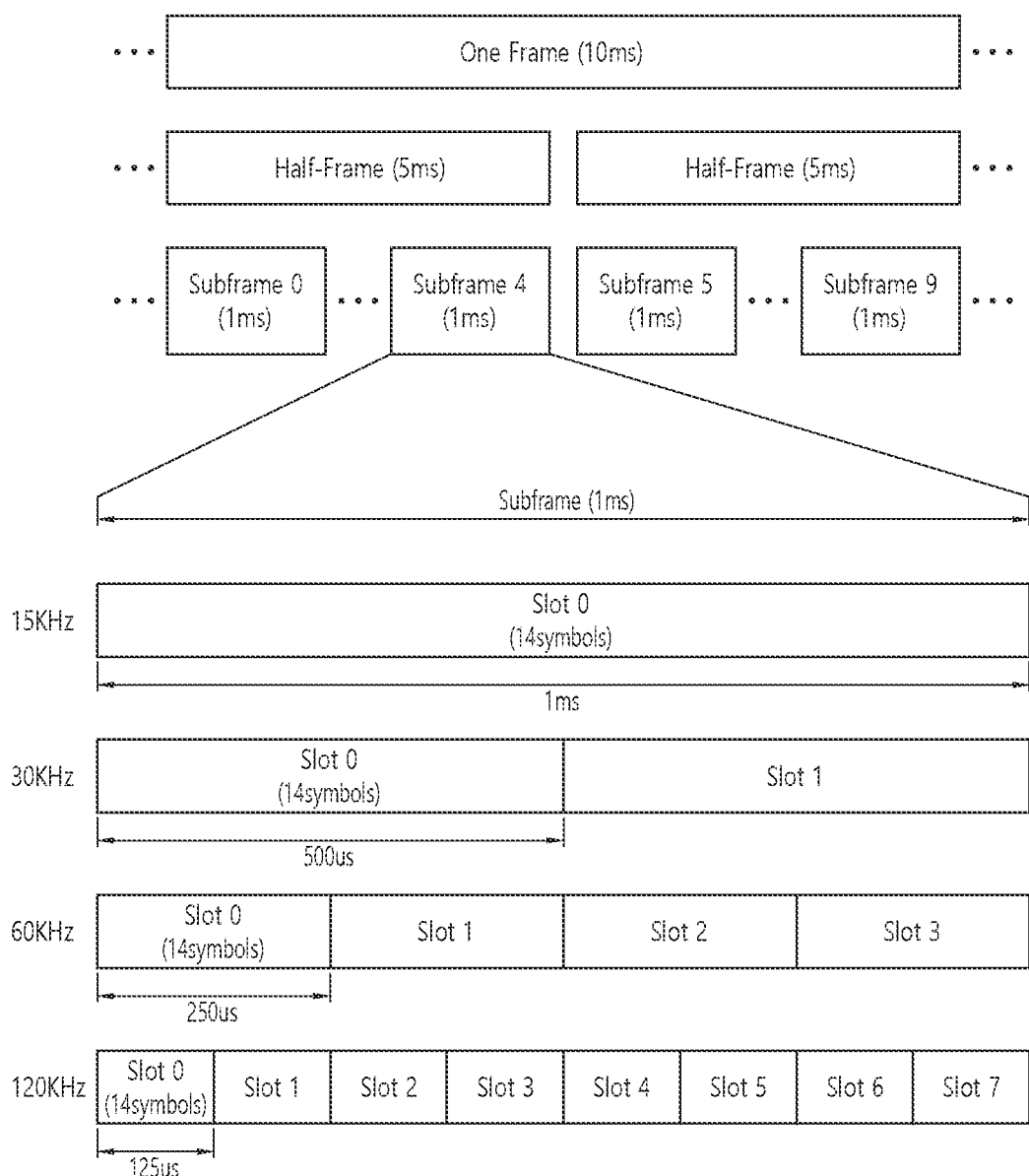
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u \ast 15$ kHz. The following table shows the number of OFDM symbols per slot, the number of slots per frame, and the number of slots per for the normal CP, according to the subcarrier spacing $\Delta f = 2u \ast 15$ kHz.

TABLE 3

| u | Nslotsymb | Nframe,uslot | Nsubframe,uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2u \ast 15$ kHz.

TABLE 4

| u | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
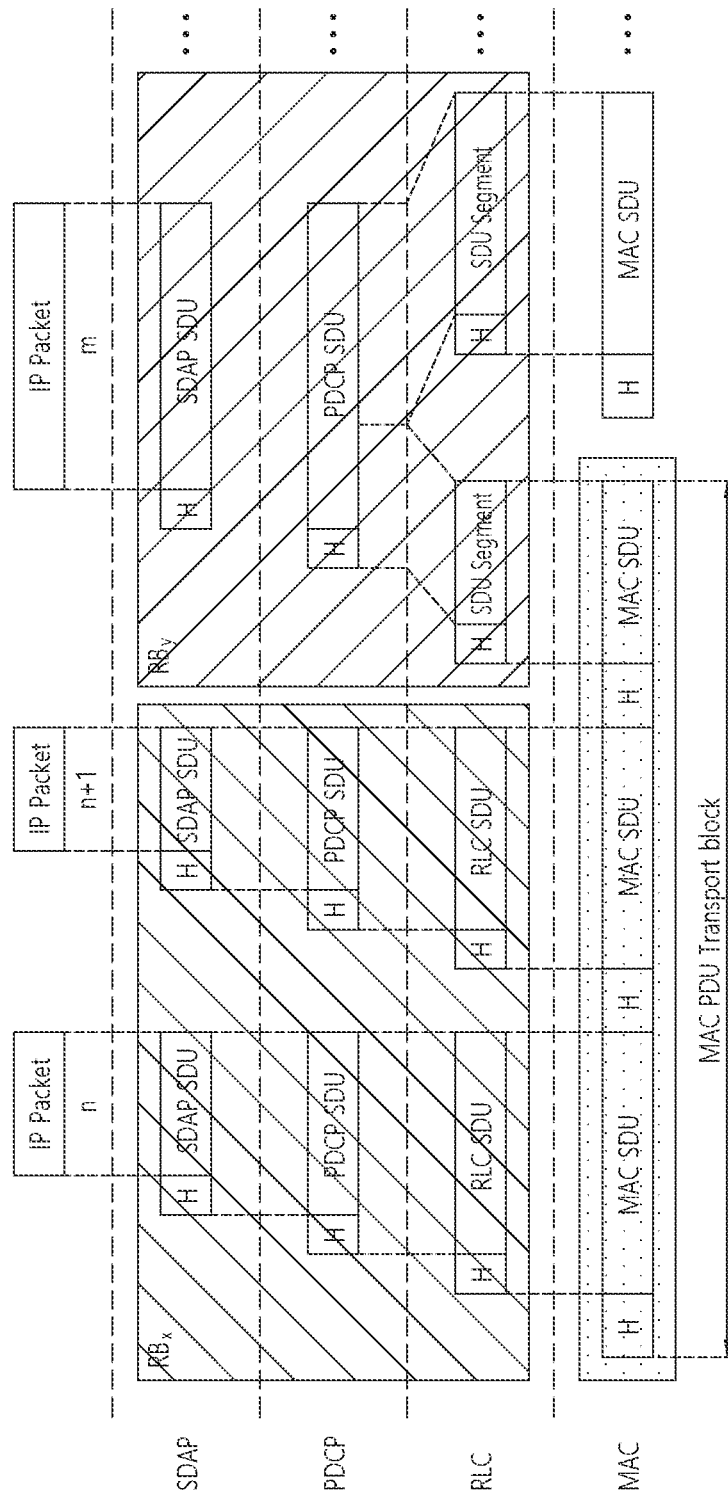
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
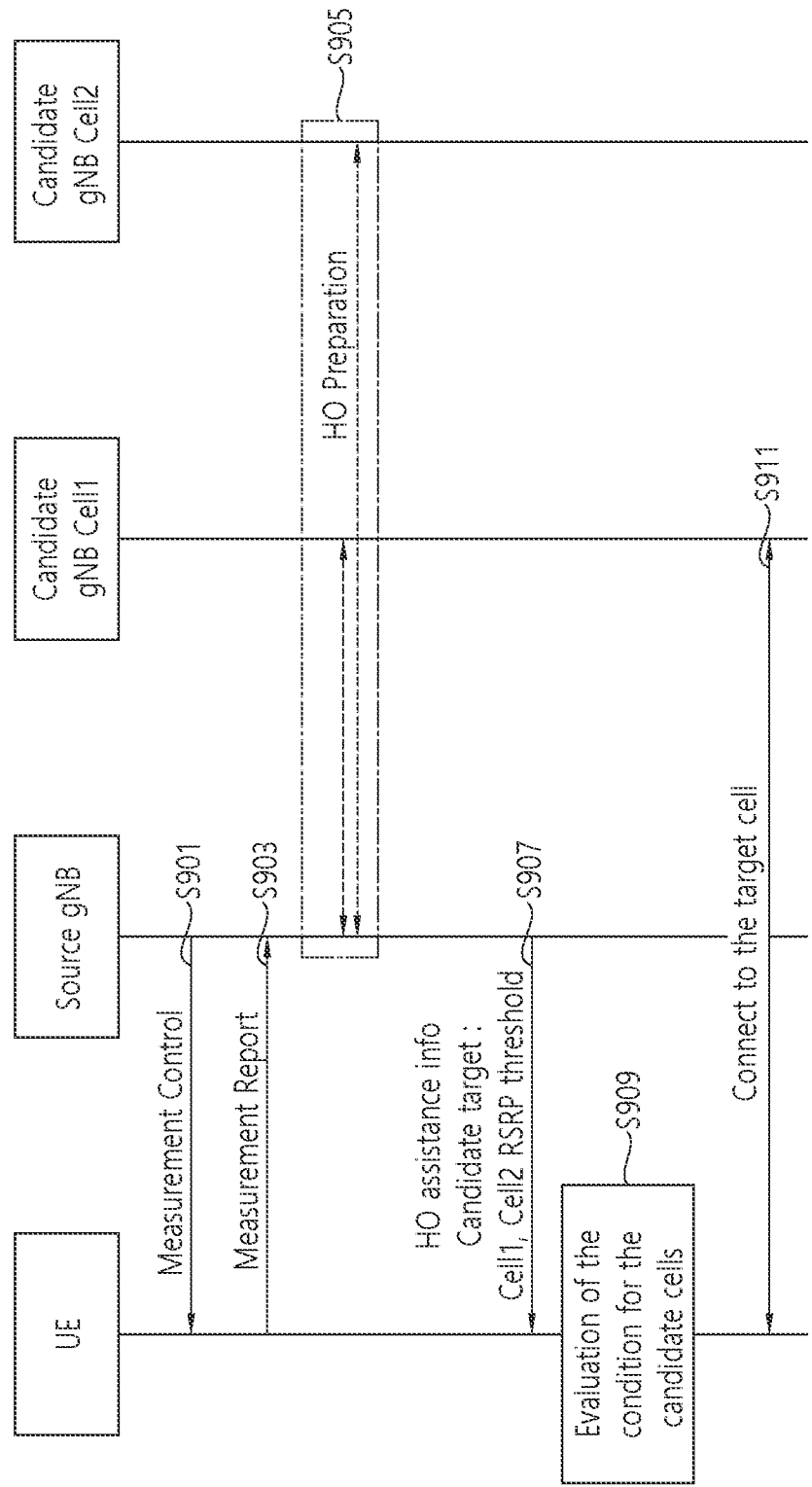
FIG. 9 shows an example of a conditional handover procedure to which technical features of the present disclosure can be applied.

FIG. 9 shows an example of a conditional handover procedure to which technical features of the present disclosure can be applied. FIG. 9 shows an overall procedure of condition based autonomous handover procedure (i.e., conditional handover procedure).

Referring to FIG. 9, in step S901, the source gNB may transmit measurement control message to the UE. The source gNB may configure the UE measurement procedures according to the roaming and access restriction information and, for example, the available multiple frequency band information through the measurement control message. Measurement control information provided by the source gNB through the measurement control message may assist the function controlling the UE's connection mobility.

In step S903, the UE may transmit a measurement report message to the source gNB. The measurement report message may comprise a result of measurement on neighbor cell(s) around the UE which can be detected by the UE. The UE may generate the measurement report message according to a measurement configuration and/or measurement control information in the measurement control message received in step S901.

In step S905, the source gNB may perform handover preparation with the candidate gNB cell 1 and the candidate gNB cell 2. The source gNB might determine the set of candidate cells (i.e., the candidate gNB cell 1 and the candidate gNB cell 2) based on the measurement report received from the UE.

In step S907, the source gNB may provide handover assistance information which includes set of candidate cells (e.g., the candidate gNB cell 1 and the candidate gNB cell 2) and handover conditions (e.g., RSRP thresholds) for a conditional handover. The handover condition can be configured for each candidate cell, or for the set of candidate cells. According to various embodiments, it would be possible for the network to prepare the candidate cells and provide the handover assistance information without the measurement report from the UE if the network is able to know the trajectory or location of the UE based on e.g. location reporting. The handover assistance information would comprise cell quality based conditions and a configuration which would be used in a target cell. Also, the handover assistance information would include configuration for one or more candidate cells. The handover assistance information may be referred to as conditional handover command.

In step S909, the UE may perform an evaluation of the handover conditions for the candidate cells. If the UE receives handover assistance information, the UE would initiate to evaluate the handover conditions for the candidate cells in the list to determine whether to perform conditional handover to one of the candidate cells.

In step S911, the UE may connect to the target cell. The UE may disconnect from the source gNB, and connect to the target cell (i.e., candidate gNB cell 1), if the handover condition for the candidate gNB cell 1 is met. The candidate gNB cell 1 may become a target cell for a conditional handover, and the UE would perform connecting to the prepared target cell.

According to various embodiments, the handover assistance information (or, the conditional handover command) may comprise handover validity timer. For example, if the handover validity timer expires, the network and/or the UE may discard a configuration associated with the conditional handover. In addition, based on a measurement report from the UE, the network would configuration, modify and/or discard the configuration associated with the conditional handover.

According to various embodiments, if the UE successfully connects to the target cell, the target cell could inform to the source cell to discard the reserved configuration of candidate cells other than the target cell.

According to various embodiments, technical features of the present disclosure can be applied to a conditional dual connectivity (DC) based handover procedure. An example of the conditional DC based handover procedure is described below.

The make-before-break (MBB) and RACH-less handover (HO) may be considered to reduce HO interruption. For example, MBB may retain a link of source cell during HO procedure. The source cell may transmit data to UE continuously until the handover is completed, so the interruption may be reduced. However, the channel quality of source cell may be getting worse quickly specially in high frequency and the stopping point of data transmission between source cell and UE may be not cleared, so the UE may not receive the data from the source cell or source cell may stop transmitting data early to UE when MBB is used. It can cause loss of data and HO interruption. In addition, the RACH-less HO may contain UL grant for HO complete message in mobility control information via RRC Connection Reconfiguration message. It can help to skip the RACH procedure and reduce the interruption. However, RACH-less HO may be only used for time aligned target cell that UE reuse the TA value. Moreover, in NR, the UL grant for target cell may be required to consider beam forming. The received UL grant for target cell would not be suitable when the actual HO is performed. Therefore, it is hard to achieve 0 ms interruption with only applying MBB and RACH-less HO.

To achieve almost 0 ms interruption handover, DC based handover may be considered. The sequence of 0 ms interruption handover with single cell may be regarded as following steps (i.e., the DC based handover procedure may comprise the following steps):

Step 1) UE sends measurement report to the source gNB;
Step 2) UE receives reconfiguration for adding target cell as SCG PSCell;
Step 3) UE sends measurement report to the master gNB. This step may be optional.
Step 4) UE receives role change request via reconfiguration message. The source cell becomes secondary gNB and the target cell becomes master gNB
Step 5) UE may receive a message to release SgNB From the above sequence, role change may be performed after UE reported MR. According to the timing of MR, several issues can be considered.

At the first, if UE reports the MR when serving cell is lower than target cell or a threshold, MgNB is likely to be dropped before the role change. Especially, high frequency and beam forming may be considered. The channel quality of high frequency cell may be attenuated quickly. When gNB of high frequency cell sends role change request message and receives role change acknowledge message, RLF would be already occurred. So, the target cell may need to be added earlier and role change should be performed quickly. However, sending role change request and receiving role change acknowledge message may be required for the role change.

On the other hand, if UE reports the MR when target cell is higher than a threshold, role change can be performed even the channel quality of PCell is better than PSCell. It may cause ping-pong and waste resources for signalling.

Moreover, there is no event which can compare the PCell and PSCell. So, if once the target cell is added as PSCell, it would be hard to compare the channel quality of source cell (i.e. PCell) and target cell (i.e. PSCell).

In legacy handover, UE may report measurement report (MR) and receive HO command when source cell decides to HO. However, in DC based handover, UE may receive SCG addition at first and UE receive role change request via the next RRC connection reconfiguration message. Likewise, the MgNB may send/receive SgNB addition/ACK to/from the target cell and MgNB may send/receive Role Change Request to/from SgNB. Therefore, the DC based handover can cause delayed handover due to multiple handshakes between the source gNB and target gNB.

The conditional handover may be considered to reduce the latency during the handover. If DC based handover is combined with conditional handover, the number of handshakes between the gNBs can be reduced and HOF could be reduced. For example, UE may report MR when the target cell is better than a threshold. The source cell may add the target cell as the SgNB and prepare the role change simultaneously when channel quality of the source cell is still in good condition. After that UE may receive role change trigger condition (e.g. PSCell is better than PCell) and trigger the role change when it is satisfied. The gNBs can change the role immediately because gNBs prepared the role change in advanced. It could reduce the role change latency and handover/role change failure could be reduced. Therefore, conditional handover with DC based handover may be considered to support 0 ms interruption.

In a wireless communication system (e.g., 5G NR), there is increasing interest in satellite communication industry, with companies and organizations convinced for the market potential for an integrated satellite and terrestrial network infrastructure. Satellites refer to spaceborne vehicles in low earth orbits (LEO), medium earth orbits (MEO), geostationary earth orbit (GEO) or in highly elliptical orbits (HEO).

Beyond satellites, Non-terrestrial networks (NTN) refer to networks, or segments of networks, using an airborne or spaceborne vehicle for transmission. Airborne vehicles refer to high altitude platforms (HAPs) encompassing unmanned aircraft systems (UAS)—including tethered UAS, lighter than air UAS and heavier than air UAS—all operating at altitude; typically between 8 and 50 km, quasi-stationary.

Hereinafter, consideration on NTN mobility impacts is described.

In LEO based non-terrestrial access network, the movement of the satellite's cell/spot beam will trigger the UE handover in a similar manner to the UE's own mobility. The UE's velocity (<=500 km/h), may be relatively much less than that of LEO satellites e.g. 7-10 km/s. This may imply that a UE in the coverage of a LEO satellite cell/spot beam will encounter more frequent handovers and it could mean that a handover takes place every few seconds. That is, a UE in the coverage of a LEO satellite cell/spot beam will encounter more frequent handovers than in a terrestrial cell.

For a UE in RRC_CONNECTED, the network can estimate when a certain UE is supposed to handover to another satellite cell/spot beam based on the knowledge of UE's location and satellite's moving speed. Therefore the conventional UE measurement report initiated handover procedures can be enhanced with the intention to reduce the handover signalling in NTN.

Conditional handover, whereby a pre-configured handover condition is instructed from the network in advance to actual handover, could be used for NTN. Actual handover will be performed after a handover condition is met. As a result, the extra handover signalling overhead in LEO NTN, because of the frequent cell change as well as potentially frequent measurement reporting, could be significantly reduced.

When UE moves between the coverage boundary of terrestrial network and NTN, some special measures e.g. cell selection/reselection, measurement objects coordination and triggering, handover preparation etc. should be considered in NTN in order to guarantee service continuity.

For a satellite-capable UE which is about to lose terrestrial cellular coverage, it is relatively straight forward for it to tune to the allowed satellite frequency bands in order to search for any possible satellite signals. But when the situation is the other way around i.e. when a satellite-capable UE currently connected to a satellite cell enters the terrestrial cellular network, handover to the terrestrial cellular network may not be automatically triggered e.g. a UE on a cruise ship would turn off searching terrestrial cell signals for the sake of power saving when out of coverage. Furthermore in the case that there is coverage overlapping between NTN and terrestrial network, when to start the measurement on terrestrial signal may be problematic because the coverage of beam foot print may be up to hundreds of kilometers. Therefore a scheme to trigger the UE to handover to a terrestrial cellular network should be introduced to allow the UE to leave the satellite connection as soon as possible if there is an acceptable terrestrial cellular signal in order for a reduced billing cost as well as boosted capacity.

As the technology advances, aerial UE such as unmanned aerial vehicle (UAV), and/or unmanned aircraft system (UAV) is introduced in wireless communication system (e.g., 5G NR). For a mobility management of an aerial UE, the aerial UE may report a flight path of the aerial UE to a network. For example, the UE may transmit UEInformation message comprising flight path information of the UE to the network. After receiving a UEinformationRegeust message from the network, to report the flight path of the UE, the UE shall:

1> if flightPathInfoReq field is present in the UEInformationRequest message and the UE has flight path information available:
2> include the flightPathInfoReport in the UEInformationResponse message and set the flightPathInfoReport to include the list of waypoints along the flight path;
2> if the includeTimeStamp in the UEInformationRequest message is set to TRUE:
3> set the field timeStamp to the time when UE intends to arrive to each waypoint if this information is available at the UE;

In a wireless communication system (e.g., 5GNR), one of the possible enhanced handover mechanisms may be autonomous condition based on handover (i.e., conditional handover). The network may provide one or more handover conditions and radio resource configuration information for candidate cells and the UE may evaluate the given handover conditions. If one of the handover conditions is satisfied, the UE may try to connect to the target cell for which the handover condition is satisfied. However, it has not discussed yet which cells has more suitable to support the UE among the candidate cells. The UE can be in various mobility scenarios such as terrestrial mobility, aerial or NTN mobility. Even though the network may configure several cells as candidate cells to support those kind of services (i.e., terrestrial service, aerial service, and/or NTN service), it need to be discussed that the network provide prioritized information to support mobility considering various service type.

Therefore, various embodiments of the present disclosure may provide a method for performing a mobility by a UE in a wireless communication system. The method may be performed by the UE, and the method may comprise: receiving information from a serving cell about candidate cells for mobility, mobility condition, and waiting condition; performing measurement to decide a first target cell among the candidate cells, based on the mobility condition and applying the waiting condition; checking the waiting condition when the first target cell meets the mobility condition; and trying to access to a target cell based on whether the waiting condition is expired or not, whether the target cell meets the mobility condition, and/or a priority of the target cell.

According to various embodiments, the priority of the target cell may be determined by a priority value provided by the network for the candidate cells.

According to various embodiments, the priority of the target cell may be determined by measured qualities of the candidate cells. Namely, a cell with a higher quality has a higher priority than another cell with a lower quality.

As described above, the UE may try to access to a target cell based on whether the waiting condition is expired or not, whether the target cell meets the mobility condition, and/or a priority of the target cell. For example, the UE may perform operation 1), 2) or 3):

1) Trying to access to a second target cell of which priority is the highest among the candidate cells including the first target cell, when the second target cell meets the mobility condition before the waiting condition is expired;
2) Trying to access to a third target cell of which priority is higher than the priority of the first target cell, when i) the waiting condition is expired, and ii) the third target cell met the mobility condition and none of the other candidate cells met the mobility condition before expiry of the waiting condition 3) Trying to access to the first target cell when i) the waiting condition is expired, and ii) none of the other candidate cells met the mobility condition before expiry of the waiting condition.

Figure 10:
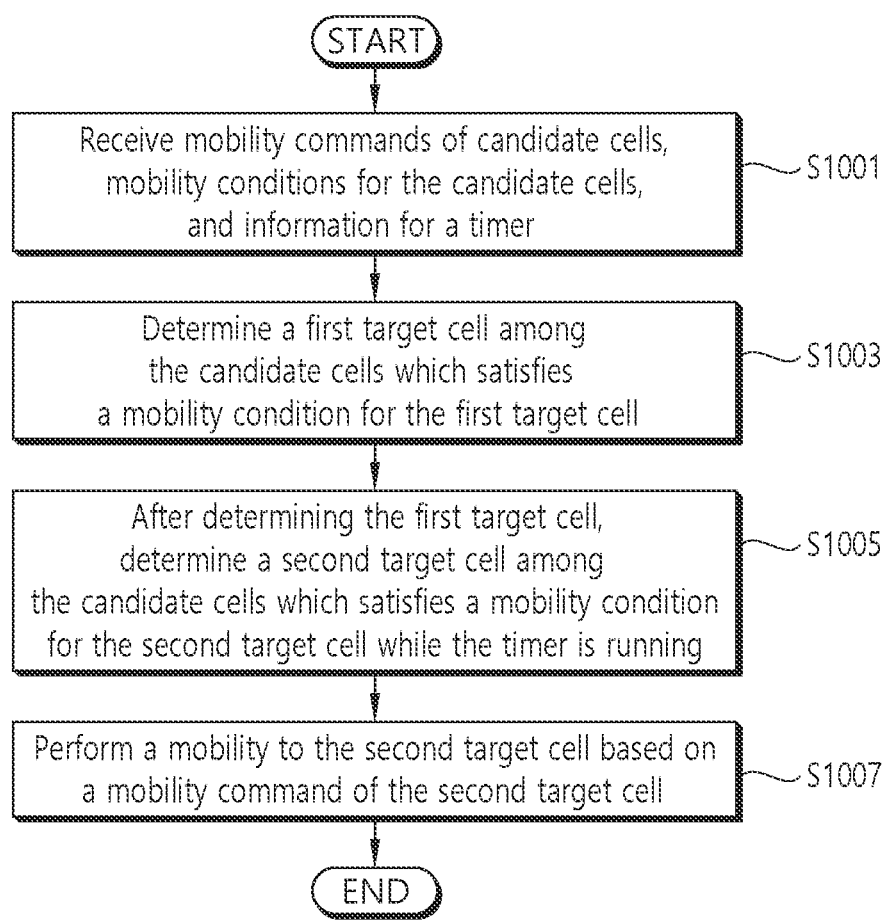
FIG. 10 shows an example of a method for a priority-based conditional mobility according to an embodiment of the present disclosure.

FIG. 10 shows an example of a method for a priority-based conditional mobility according to an embodiment of the present disclosure. The steps illustrated in FIG. 10 may be performed by a wireless device and/or a UE.

Referring to FIG. 10, in step S1001, the wireless device may receive mobility commands of candidate cells, mobility conditions for the candidate cells, and information for a timer. The wireless device may receive mobility commands of candidate cells, mobility conditions for the candidate cells, and information for a timer from a source cell and/or a RAN node related to the source cell. The timer may also be referred to as a waiting timer.

In step S1003, the wireless device may determine a first target cell among the candidate cells which satisfies a mobility condition for the first target cell. The wireless device may determine whether a candidate cell satisfies a mobility condition for the candidate cell based on a result of a measurement (e.g., signal quality, signal strength, channel quality, channel state, reference signal received quality (RSRQ), and/or reference signal received power (RSRP)) on the candidate cell.

In step S1005, after determining the first target cell, the wireless device may determine a second target cell among the candidate cells which satisfies a mobility condition for the second target cell while the timer is running. Herein, a priority of the second target cell determined while the timer is running is higher than a priority of the first target cell determined previously. That is, the wireless device may determine a second target cell which satisfies the mobility condition for the second target cell, and whose priority is higher than that of the first target cell. The timer may start upon determining the first target cell. The priority may also be referred to as cell priority.

In step S1007, the wireless device may perform a mobility to the second target cell based on a mobility command of the second target cell. For example, if the wireless device identified the second target cell satisfying the mobility condition for the second target cell, the wireless device may identify the mobility command of the second target cell among the received mobility commands of the candidate cells. The wireless device may apply the identified mobility command of the second target cell to perform the mobility to the second target cell.

According to various embodiments, the mobility conditions for the candidate cells may comprise the mobility condition for the first target cell and the mobility condition for the second target cell.

According to various embodiments, the wireless device may receive, from a network, configuration information comprising the priority of the first target cell and the priority of the second target cell via higher layer signalling. For example, the wireless device may receive, from the source cell, the configuration information comprising priorities of the candidate cells via higher layer signalling. Each of the priorities may be related to each of the candidate cells. The priorities of the candidate cells may comprise the priority of the first target cell and the priority of the second target cell. In other words, the priorities of the candidate cells may be configured by the network to the wireless device via higher layer signalling.

According to various embodiments, the wireless device may measure a signal quality for each of the candidate cells. The wireless device may determine a priority of each of the candidate cells based on the signal quality so that a candidate cell with higher signal quality may have a higher priority. In other words, the wireless device may prioritize the candidate cells based on the signal quality so that a candidate cell with a higher signal quality may have a higher priority. As stated above, since the priority of the second target cell is higher than the priority of the first target cell, a signal quality for the second target cell may be higher than a signal quality for the first target cell.

According to various embodiments, the priority of the second target cell may be highest among priorities of the candidate target cells. That is, in step S1005, the wireless device may determine a second target cell which satisfies the mobility condition for the second target cell, and whose priority is highest among the candidate target cells.

According to various embodiments, the wireless device may receive, from a network, a validity timer (e.g., T304 timer) related to a time period during which the mobility commands are valid. The wireless device may start the validity timer upon receiving the mobility commands. The waiting timer runs while the validity timer is running. That is, a time period related to the waiting timer (i.e., a time period during which the waiting timer runs) may be included in a time period related to the validity timer (i.e., a time period during which the validity timer runs).

According to various embodiments, the wireless device may receive, from a network, a scaling factor (or, waiting scaling factor) mapped to the priority of the second target cell. The wireless device may apply the scaling factor to the mobility condition for the second target cell. The wireless device may determine whether the second target cell satisfies the mobility condition for the second target cell to which the scaling factor is applied based on a result of a measurement on the second target cell.

According to various embodiments, the scaling factor may be applied to a first offset of the mobility condition (e.g., first offset for event A3 in the mobility condition) for the second target cell to obtain a second offset (e.g., second offset for event A3 in the mobility condition) lower than the first offset. The scaling factor may be applied to a first serving cell threshold of the mobility condition (e.g., first serving cell threshold for event A5 in the mobility condition) for the second target cell to obtain a second serving cell threshold (e.g., second serving cell threshold for event A5 in the mobility condition) higher than the first serving cell threshold. The scaling factor may be applied to a first neighbor cell threshold of the mobility condition (e.g., first neighbor cell threshold for event A5 in the mobility condition) for the second target cell to obtain a second neighbor cell threshold (e.g., second neighbor cell threshold for event A5 in the mobility condition) lower than the first neighbor cell threshold. The scaling factor may be applied to a first TTT value of the mobility condition (e.g., first TTT value for event A3/A5 in the mobility condition) for the second target cell to obtain a second TTT value (e.g., second TTT Value for event A3/A5 in the mobility condition) shorter than the first TTT value.

According to various embodiments, the wireless device may receive, from a network, an offset (or, waiting offset) mapped to the priority of the second target cell. The wireless device may apply the offset to the mobility condition for the second target cell. The wireless device may determine whether the second target cell satisfies the mobility condition for the second target cell to which the offset is applied based on a result of a measurement on the second target cell.

According to various embodiments, the offset may be applied to a first serving cell threshold of the mobility condition (e.g., first serving cell threshold for event A5 in the mobility condition) for the second target cell to obtain a second serving cell threshold (e.g., second serving cell threshold for event A5 in the mobility condition) higher than the first serving cell threshold by the offset. The offset may be applied to a first neighbor cell threshold of the mobility condition (e.g., first neighbor cell threshold for event A5 in the mobility condition) for the second target cell to obtain a second neighbor cell threshold (e.g., second neighbor cell threshold for event A5 in the mobility condition) lower than the first neighbor cell threshold by the offset.

According to various embodiments, the wireless device may transmit, to a network, information regarding a service requested by the wireless device. The information regarding a service requested by the wireless device may comprise at least one of a service type (e.g., aerial service, NTN service, heterogeneous/homogenous terrestrial communication service), UE location, flight plan, or functional capability of the wireless device. For example, the wireless device may perform location reporting, UE information reporting, transmission of measurement report, and/or transmission of UEInformationResponse, to transmit the information regarding the serving requested by the wireless device to the network. The priorities of the candidate cells (e.g., the priority of the first target cell and the priority of the second target cell) may be determined based on the information regarding the service. For example, a RAN node related to a source cell may receive the information regarding the service from the wireless device, and may determine the priorities of the candidate cells based on the information regarding the service. Then, the RAN node related to a source cell may transmit, to the wireless device, the configuration information comprising the determined priorities of the candidate cells via higher layer signallings.

Figure 11:
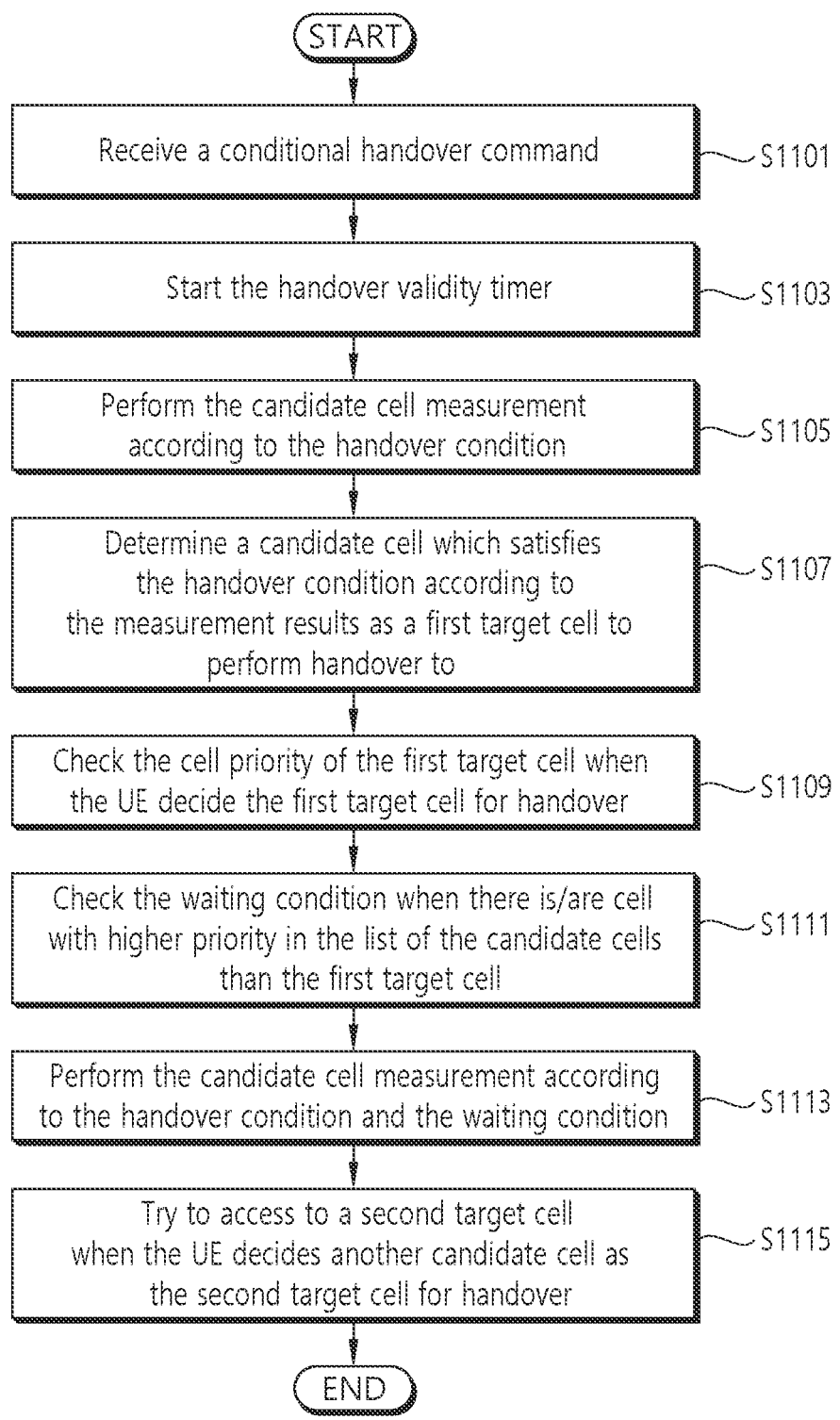
FIG. 11 shows another example of a method for a priority-based conditional mobility according to an embodiment of the present disclosure.

FIG. 11 shows another example of a method for a priority-based conditional mobility according to an embodiment of the present disclosure. The steps illustrated in FIG. 11 may be performed by a UE and/or a wireless device. FIG. 11 illustrates features for conditional handover exemplary, but the illustrated features may also be applied to a conditional mobility. In FIG. 11, the UE may be in RRC_CONNECTED state on source cell, but RRC state of the UE may not be limited thereto.

Referring to FIG. 11, in step S1101, the UE may receive a conditional handover command. The conditional handover command may include a list of one or more candidate cells for a handover. The conditional handover command can be provided to the UE by RRC dedicated signalling or broadcast information such as system information. Furthermore, the conditional handover command may include one or more following information to perform the conditional handover:

Handover validity timer(s): The handover validity timer may be configured per each candidate cell or per group of the candidate cells. An example of the handover validity timer may be T304 timer. The handover validity timer may be used to indicate a valid duration to perform a procedure of conditional handover. After the handover validity timer is expired, the conditional handover command is no longer valid and the network may release the resources reserved for handover preparation.

Handover condition(s) (e.g. event based condition such as measurement event A2, A3 or A5): The handover condition may be configured per each candidate cell or per group of the candidate cells. The handover condition may be used to determine which candidate cell is suitable to move to from the source cell. When the handover condition for a candidate cell is satisfied e.g. the handover condition for an event is met upon expiry of a TTT for the event, the UE may determine that the candidate cell is suitable for target cell for handover.

Cell priority(s): The cell priority which may be integer value may be provided per each candidate cell but the network also may not provide the cell priority for a candidate cell which has the lowest priority. The cell priority may be used to indicate which cell is more efficient to perform mobility among the candidate cells in terms of the network side. In other case, the network may not provide cell priority information at all, then the UE may prioritize all candidate cells based on the each cell's measured quality (e.g., signal quality, signal strength, channel quality, channel state, RSRP, RSRQ) obtained by measurements on the candidate cells for handover.

Waiting condition(s): The waiting condition may be used to provide additional procedure for the UE to reselect target cell which has higher cell priority than the current target cell. The waiting condition may be applied after selecting a target cell which doesn't have the highest cell priority among the candidate cells for handover. For providing the waiting condition, the network may configure waiting timer value, offset and/or scaling value (i.e., scaling factor) to apply the handover condition or the handover validity timer to the UE.

The network may provide additional condition such as offset value or threshold for the source cell's signal quality as one of the waiting condition. It may be possible that the signal quality of the source cell becomes extremely low which may cause radio link failure. The UE may check the additional condition and when the additional condition is met, the waiting condition may be no more valid. In this case, the UE may just trigger handover without using the waiting condition.

According to various embodiments, at least one of the handover validity timer, handover condition, cell priority, waiting condition and/or additional condition may not be included in the handover command but separate from the handover command. In this case, at least one of the handover validity timer, handover condition, cell priority, waiting condition and/or additional condition may be provided to the UE by RRC message together with the handover command. For example, the UE may receive the RRC message (e.g., RRC connection reconfiguration message, RRC reconfiguration message, conditional reconfiguration message, CHO configuration message) comprising at least one of the handover command, the handover validity timer, handover condition, cell priority, waiting condition and/or additional condition.

In step S1103, the UE may start the handover validity timer which is received by (or, received together with) the conditional handover command. The UE may start the handover validity timer right after receiving the conditional handover command or when the UE determined a target cell among the candidate cell list.

In step S1105, the UE may perform the candidate cell measurement according to the handover condition i.e. measurement event for the each candidate cell.

In step S1107, the UE may determine a candidate cell which satisfies the handover condition according to the measurement results as a first target cell to perform handover to.

In step S1109, the UE may check the cell priority of the first target cell when the UE decide the first target cell for handover. The UE may check whether the first target cell has the highest cell priority among the candidate cells for handover. If the first target cell does not have the highest cell priority, it means that there is a candidate cell which has better condition (i.e., higher priority) to provide the service to the UE in the list of the candidate cells than the first target cell.

In step S1111, the UE may check the waiting condition such as waiting timer, waiting offset value, and waiting scaling factor when there is/are cell with higher priority in the list of the candidate cells than the first target cell. To select another new target cell to move to which has higher priority among the candidate cells if the UE has selected a target cell which doesn't have the highest cell priority, the UE may apply the waiting condition like below and the waiting timer, waiting scaling factor and/or waiting offset can be optionally configured together or not.

1) Waiting Timer/Waiting Time Value

The information on the waiting timer/waiting time value may be working while running the handover validity timer. To provide this information, the network may configure the waiting timer or waiting time value.

If the UE receives information on the waiting timer, the UE may start the waiting timer when the handover validity timer is started, or when the UE decides the first target cell. When the UE decides the first target cell, the UE may not trigger the handover and wait to decide another target cell if the first target cell is not related to the highest cell priority. After expiry of the waiting timer, the UE doesn't wait for another target cell anymore and trigger the handover to the target cell if there is no candidate cell to be decided as the another target cell.

If the UE receives information on the waiting time value, the UE check the waiting time value with the handover validity timer. When the UE decides the first target cell, the UE may not trigger the handover and wait to decide another target cell if the decision time for the first target cell is lesser than the waiting time value. When the run time of the handover validity timer is larger than the waiting time value, the UE doesn't wait for another target cell anymore and trigger the handover to the target cell if there is no candidate cell to be decided as the another target cell.

2) Waiting Scaling Factor

The waiting scaling factor may be a value to apply to the handover condition such as time to trigger (TTT), threshold, and/or offset value. The network may provide different waiting scaling factors to the candidate cells according to the cell priority. When the UE decides the first target cell, the UE may not trigger the handover and wait to decide another target cell with the scaled handover condition if the first target cell is not related to the highest cell priority.

3) Waiting Offset

The waiting offset may be a value to apply to the threshold of handover condition. The network may provide different waiting offsets to the candidate cells according to the cell priority. When the UE decides the first target cell, the UE may not trigger the handover and wait to decide another target cell based on the updated thresholds of the handover condition to which the waiting offset is applied if the first target cell is not related to the highest cell priority.

In step S1113, the UE may perform the candidate cell measurement according to the handover condition and the waiting condition.

In step S1115, the UE may try to access to a second target cell when the UE decides another candidate cell as the second target cell for handover. The second target cell may satisfy the handover condition and the waiting condition.

Figure 12:
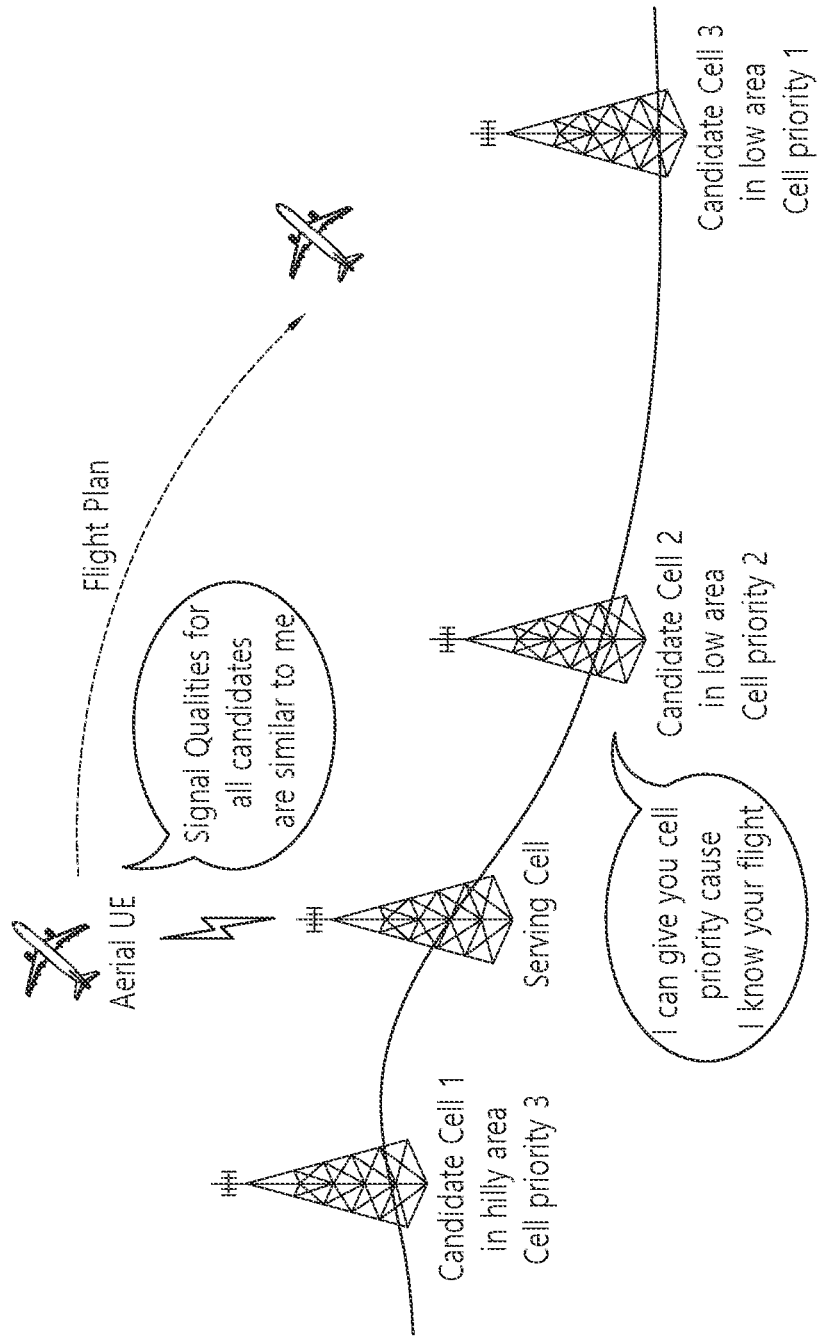
FIG. 12 shows an example of mobility situation in aerial UE scenario according to an embodiment of the present disclosure.
Figure 13:
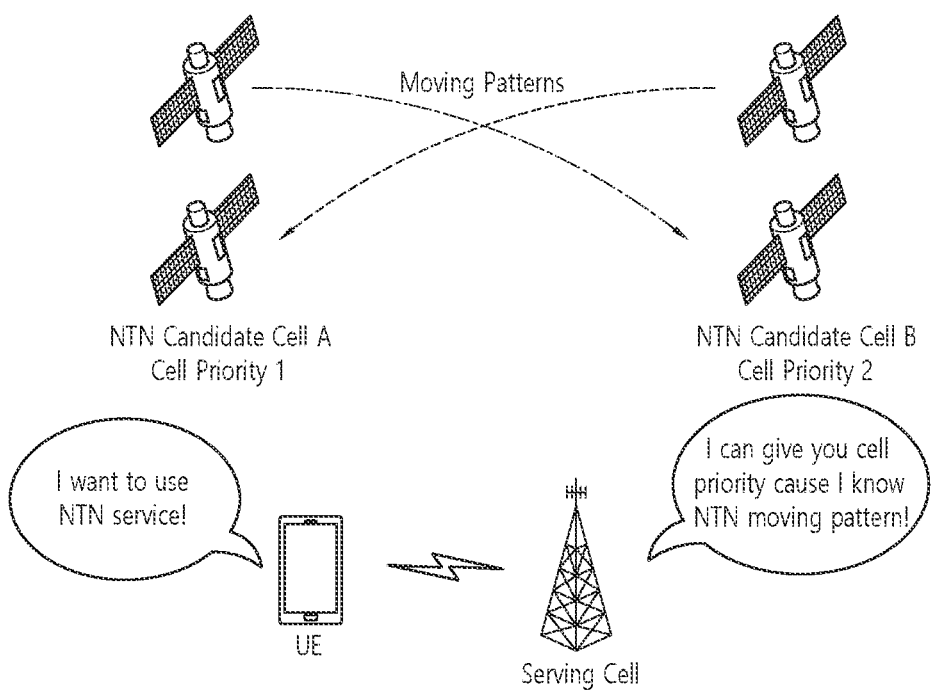
FIG. 13 shows an example of mobility situation in NTN UE scenario according to an embodiment of the present disclosure.
Figure 14:
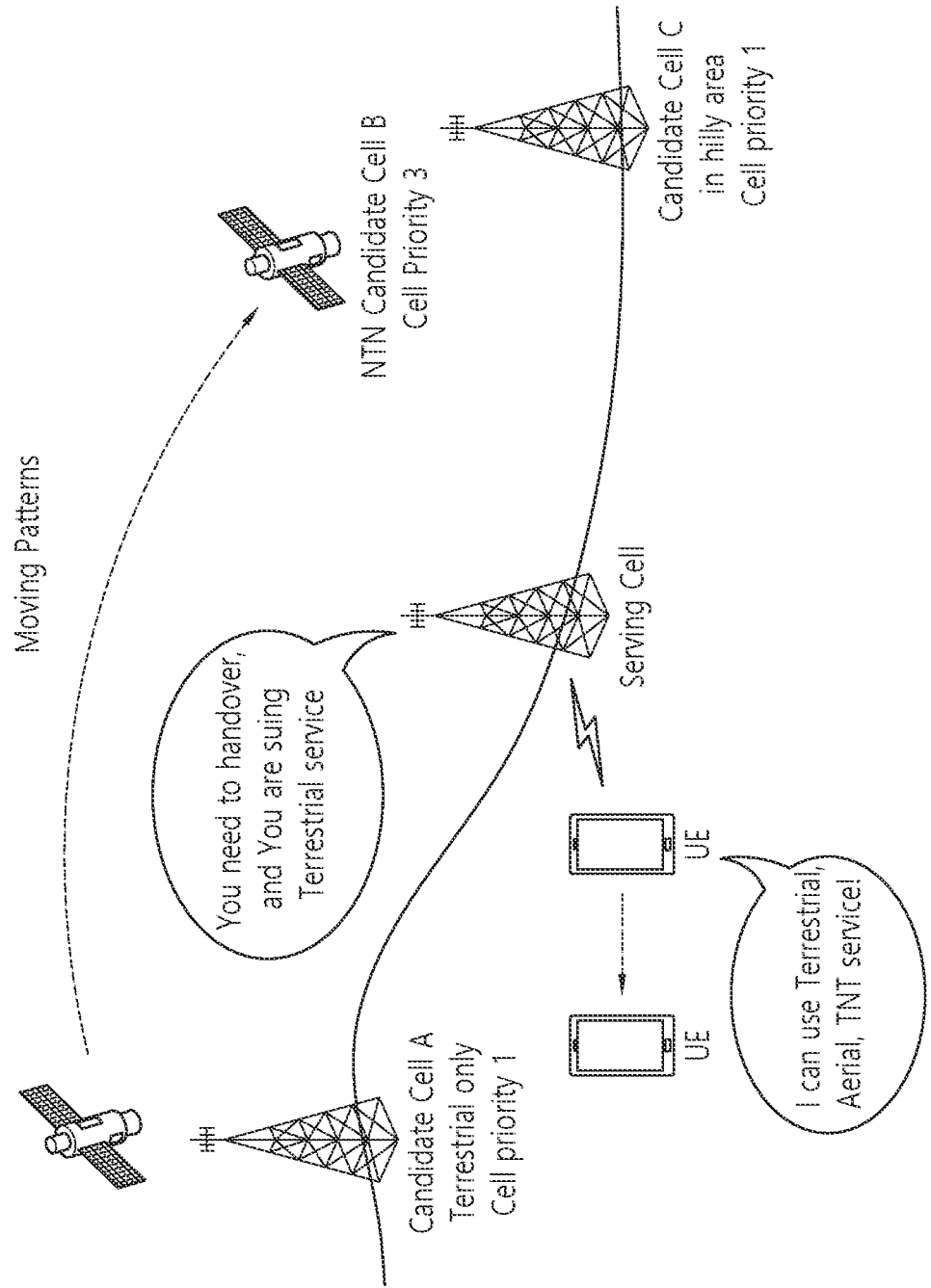
FIG. 14 shows an example of mobility situation in mobility scenario for various services according to an embodiment of the present disclosure.

In FIGS. 12 to 14, some scenarios in which cell priority may be considered are described.

FIG. 12 shows an example of mobility situation in aerial UE scenario according to an embodiment of the present disclosure. FIG. 12 illustrates features for conditional handover exemplary, but the illustrated features may also be applied to a conditional mobility.

Referring to FIG. 12, the network may be serving an aerial UE and may know the aerial UE's location or the aerial UE's flight plan via location reporting or UE Information reporting (e.g. MeasurementReport, UEInformationResponse). When the network decides that the aerial UE need to handover to other cell from the serving cell, the network may provide candidate cell list and cell priority for conditional handover. The cell priority can help UE to decide more reliable target cell considering flight status and/or flight plan if one or more candidate cells have similar signal quality.

FIG. 13 shows an example of mobility situation in NTN UE scenario according to an embodiment of the present disclosure. FIG. 13 illustrates features for conditional handover exemplary, but the illustrated features may also be applied to a conditional mobility.

Referring to FIG. 13, the network may be serving a UE which requests to the network to use NTN service and may know the candidate satellite's moving pattern (e.g., orbit via network interface such as S1 or X2 interface). When the network decides that the UE need to handover to other cell to provide NTN service, the network may provide candidate cell list and cell priority for conditional handover. The cell priority can help the UE to decide more reliable target cell considering satellite's moving patterns if one or more satellites as the candidate cells have similar signal quality.

FIG. 14 shows an example of mobility situation in mobility scenario for various services according to an embodiment of the present disclosure. FIG. 14 illustrates features for conditional handover exemplary, but the illustrated features may also be applied to a conditional mobility.

Referring to FIG. 14, the network may be serving a UE which has functional capability for various service type (e.g., aerial service, NTN service, or Heterogeneous/Homogeneous terrestrial communication service) and the network knows the UE's status that which service scenario is applicable to the UE. In FIG. 14, it is assumed that terrestrial service is required. When the network decide that the UE need to handover to other cell from the serving cell, the network may provide candidate cell list and cell priority for conditional handover. The cell priority can help the UE to decide more suitable target cell considering the UE's service requirements if one or more candidate cells have similar signal quality.

Figure 15:
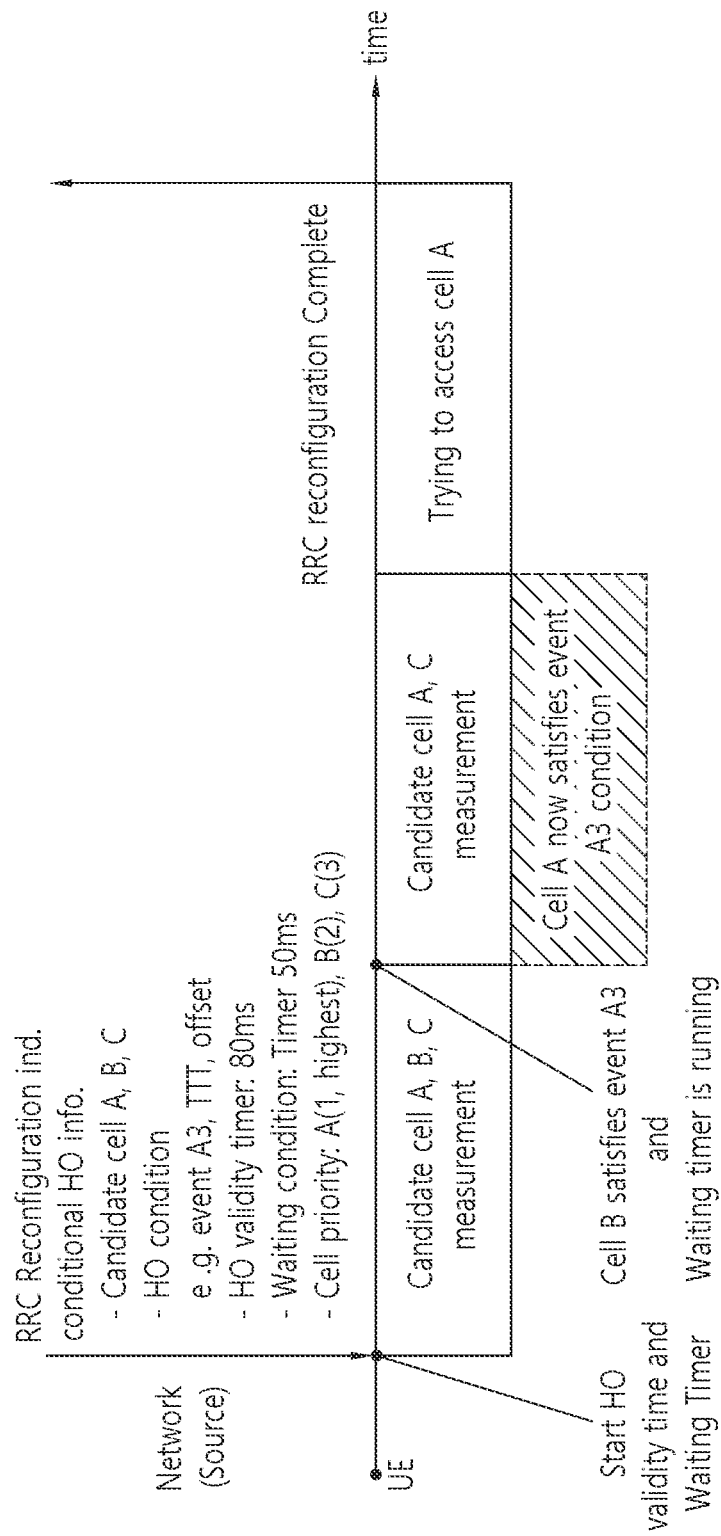
FIG. 15 shows an example of conditional mobility procedure in which target cell is reselected according to an embodiment of the present disclosure.
Figure 16:
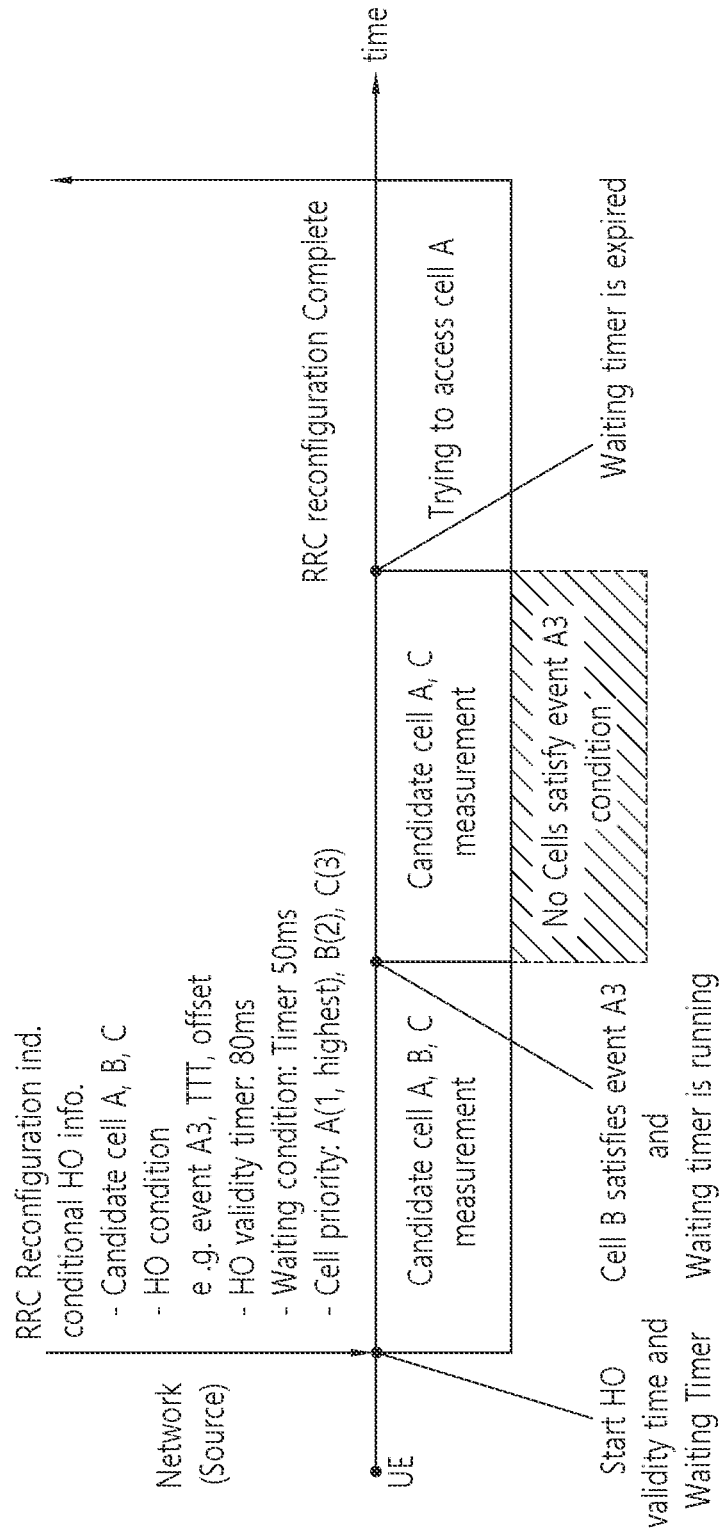
FIG. 16 shows an example of conditional mobility procedure in which target cell reselection is failed according to an embodiment of the present disclosure.

FIG. 15 shows an example of conditional mobility procedure in which target cell is reselected according to an embodiment of the present disclosure. FIG. 16 shows an example of conditional mobility procedure in which target cell reselection is failed according to an embodiment of the present disclosure. FIGS. 15 and 16 illustrate features for conditional handover exemplary, but the illustrated features may also be applied to a conditional mobility.

Referring to FIG. 15, The UE is connecting to a network and/or source cell (e.g. gNB, eNB). The source cell may decide that the UE needs to perform handover because the signal quality for the source cell may be getting lower or other type of service which is not supportable in the serving source cell may be required by the UE. The source cell may request to one and more neighbor cells to prepare handover for the UE. After handover preparation with the several neighbor cells, the source cell may provide conditional handover command to the UE.

The UE may receive a RRC message to perform conditional handover (i.e. RRC reconfiguration including conditional handover command). The conditional handover command and/or the RRC message may include information on one and more candidate cells as a list (e.g. cell A, cell B and cell C), each candidate cell's handover condition(s), and handover validity timer. The each candidate cell's handover condition may be similar to the reporting condition for measurement reporting (e.g. event A3). In conditional handover procedure, after receiving the conditional handover command, the UE may autonomously perform handover without reporting measurement result to the source cell and without receiving any additional handover command from the source cell when one of candidate cell's handover condition is satisfied (e.g. handover condition for event A5 is considered to be satisfied when source cell's signal quality becomes lower than a threshold and signal quality for one of candidate cells becomes better than another threshold). The each candidate cell's handover condition can be configured per cell or per conditional handover command.

Upon receiving the conditional handover command, the UE may start the handover validity timer and perform measurement on the candidate cells. Also, the UE may start the waiting timer to check the waiting condition later. The cell A, B, C may have a handover condition which seems like event A3/A5 with time-to-trigger, cell offsets, hysteresis value (e.g., serving cell becomes lower than a serving cell threshold and the candidate cell becomes better than neighbor cell threshold). Then, the UE may check that the cell B satisfies the handover condition for the cell B which means that the cell B is applicable for event A3 during the timer-to-trigger defined for the event A3. The UE may decide the cell B as a target cell to perform handover. For another example, the UE may start the waiting timer upon determining the target cell (e.g., cell B).

Before accessing to the cell B, the UE may check existence of the waiting condition. Because the waiting condition is configured by the network when the UE received the conditional handover command, the UE may check whether the cell B is related to the highest cell priority. Since the cell priority of the cell B is not the highest, the UE may keep performing measurement for the rest of the candidate cells rather than triggering handover to the cell B as target cell.

As described in FIG. 15, The UE may regard the cell A as a new target cell because, before expiry of the waiting timer, the cell A which is the related to the highest cell priority or cell priority higher than that of cell B in the list of the candidate cells satisfied the handover condition. Then, instead of the cell B, the UE may try to access to the cell A for handover. While trying to access to the cell A from the source cell, the UE may keep measuring other candidate cell's quality if possible. The cell B satisfied handover condition for event A3 to trigger handover but the UE doesn't perform any action related to the cell B while the handover validity timer is running.

However, as described in FIG. 16, the UE may regard the cell B as the target cell which still satisfies the handover condition even though the cell B is not related to the highest cell priority in the list of the candidate cells if no candidate cells (e.g., cell A, C) satisfied the handover condition before expiry of the waiting timer. Then, the UE may try to access to the cell B for handover because the cell B is related to the highest cell priority among the candidate cells which satisfied the handover condition.

Using the UE's status or preference such as flight path or service request, the network may provide more suitable candidate cell for the conditional handover. Rather than performing handover as soon as target cell is decided, the UE may perform additional handover procedure in some scenarios like above examples in which signal quality based decision cannot consider the UE's status or preference.

Especially in the case of that the UE has functional capability to support various type of service such as aerial service, NTN service, and/or heterogeneous/homogenous terrestrial communication service, the UE may be able to estimate which cell is the most expected cell in terms of the network. It can be also beneficial to reduce the rate of handover failure or configuration failure because the network may also provide the cell priority to some cells which has similar environment with the source cell so that many configurations may not need to be changed.

Figure 17:
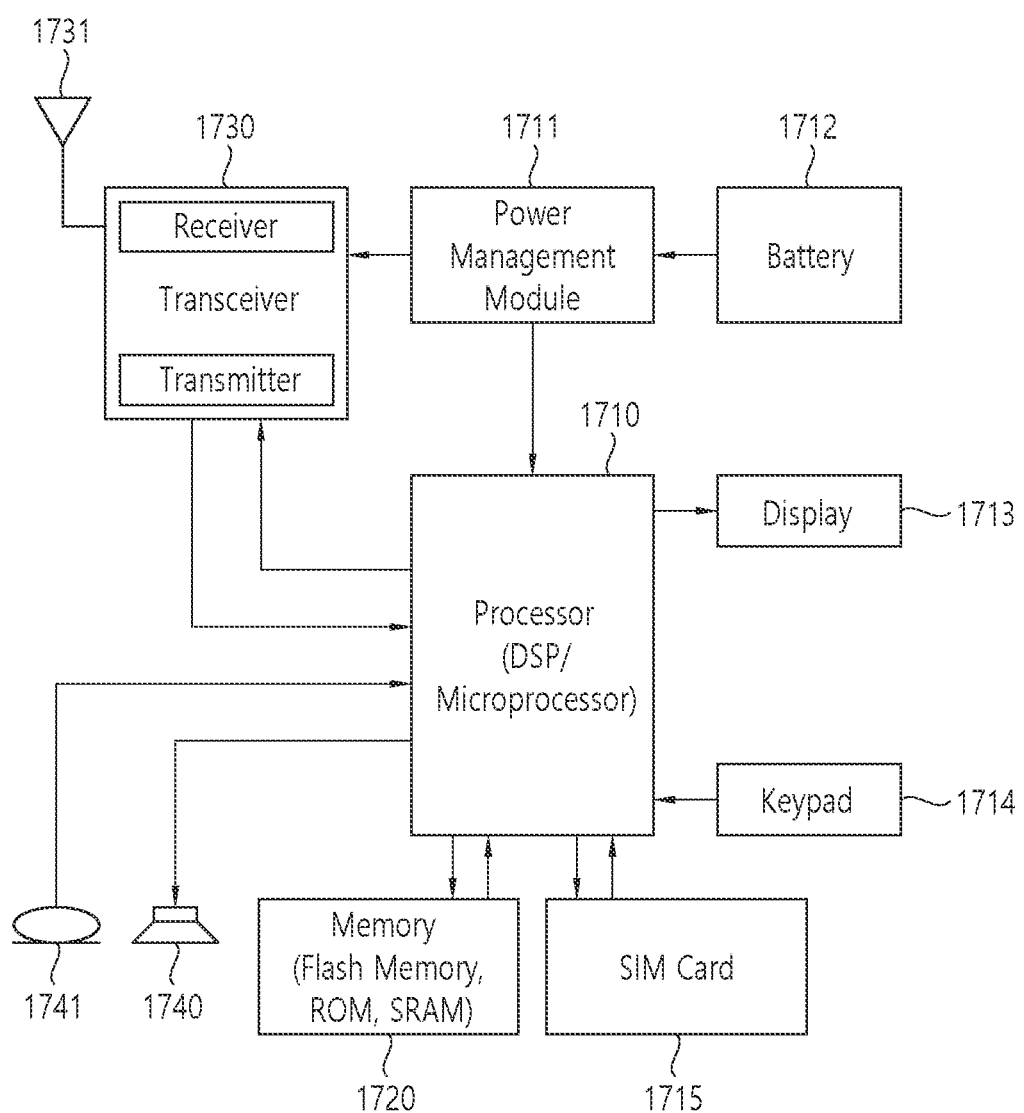
FIG. 17 shows a UE to implement an embodiment of the present disclosure. The present disclosure described above for UE side may be applied to this embodiment.

FIG. 17 shows a UE to implement an embodiment of the present disclosure. The present disclosure described above for UE side may be applied to this embodiment.

A UE includes a processor 1710, a power management module 1711, a battery 1712, a display 1713, a keypad 1714, a subscriber identification module (SIM) card 1715, a memory 1720, a transceiver 1730, one or more antennas 1731, a speaker 1740, and a microphone 1741.

The processor 1710 may be configured to implement proposed functions, procedures and/or methods described in this description. Layers of the radio interface protocol may be implemented in the processor 1710. The processor 1710 may include application-specific integrated circuit (ASIC), other chipset, logic circuit and/or data processing device. The processor 1710 may be an application processor (AP). The processor 1710 may include at least one of a digital signal processor (DSP), a central processing unit (CPU), a graphics processing unit (GPU), a modem (modulator and demodulator). An example of the processor 1710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1710 may be configured to, or configured to control the transceiver 1730 to implement steps performed by the UE and/or the wireless device throughout the disclosure.

The power management module 1711 manages power for the processor 1710 and/or the transceiver 1730. The battery 1712 supplies power to the power management module 1711. The display 1713 outputs results processed by the processor 1710. The keypad 1714 receives inputs to be used by the processor 1710. The keypad 1714 may be shown on the display 1713. The SIM card 1715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1720 is operatively coupled with the processor 1710 and stores a variety of information to operate the processor 1710. The memory 1720 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

The transceiver 1730 is operatively coupled with the processor 1710, and transmits and/or receives a radio signal. The transceiver 1730 includes a transmitter and a receiver. The transceiver 1730 may include baseband circuitry to process radio frequency signals. The transceiver 1730 controls the one or more antennas 1731 to transmit and/or receive a radio signal.

The speaker 1740 outputs sound-related results processed by the processor 1710. The microphone 1741 receives sound-related inputs to be used by the processor 1710.

Figure 18:
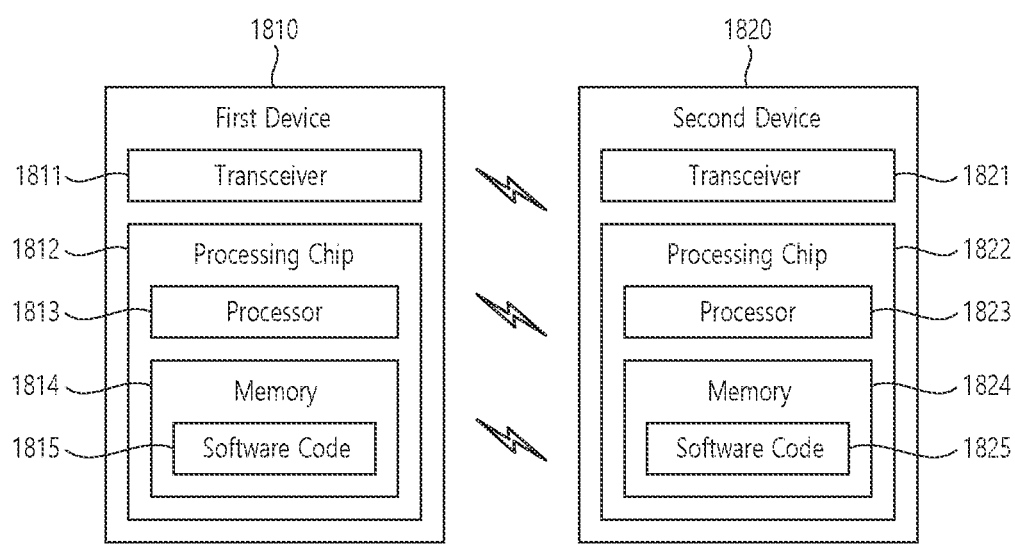
FIG. 18 shows another example of a wireless communication system to which the technical features of the present disclosure can be applied.

FIG. 18 shows another example of a wireless communication system to which the technical features of the present disclosure can be applied.

Referring to FIG. 18, the wireless communication system may include a first device 1810 (i.e., first device 210) and a second device 1820 (i.e., second device 220).

The first device 1810 may include at least one transceiver, such as a transceiver 1811, and at least one processing chip, such as a processing chip 1812. The processing chip 1812 may include at least one processor, such a processor 1813, and at least one memory, such as a memory 1814. The memory may be operably connectable to the processor 1813. The memory 1814 may store various types of information and/or instructions. The memory 1814 may store a software code 1815 which implements instructions that, when executed by the processor 1813, perform operations of the first device 910 described throughout the disclosure. For example, the software code 1815 may implement instructions that, when executed by the processor 1813, perform the functions, procedures, and/or methods of the first device 1810 described throughout the disclosure. For example, the software code 1815 may control the processor 1813 to perform one or more protocols. For example, the software code 1815 may control the processor 1813 to perform one or more layers of the radio interface protocol.

The second device 1820 may include at least one transceiver, such as a transceiver 1821, and at least one processing chip, such as a processing chip 1822. The processing chip 1822 may include at least one processor, such a processor 1823, and at least one memory, such as a memory 1824. The memory may be operably connectable to the processor 1823. The memory 1824 may store various types of information and/or instructions. The memory 1824 may store a software code 1825 which implements instructions that, when executed by the processor 1823, perform operations of the second device 1820 described throughout the disclosure. For example, the software code 1825 may implement instructions that, when executed by the processor 1823, perform the functions, procedures, and/or methods of the second device 1820 described throughout the disclosure. For example, the software code 1825 may control the processor 1823 to perform one or more protocols. For example, the software code 1825 may control the processor 1823 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 19:
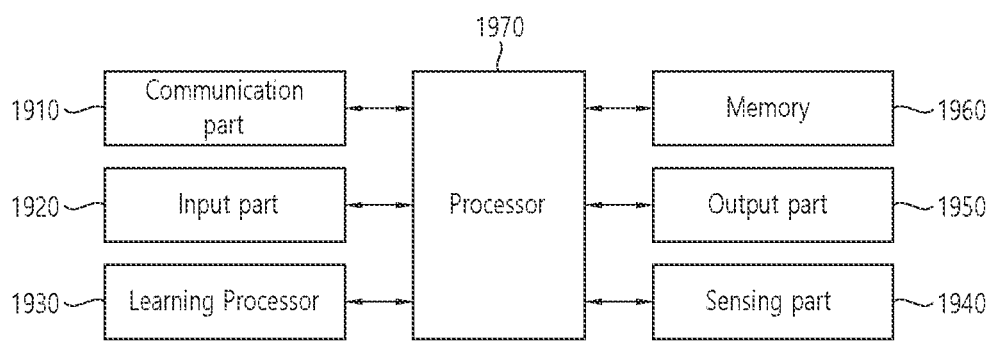
FIG. 19 shows an example of an AI device to which the technical features of the present disclosure can be applied.

FIG. 19 shows an example of an AI device to which the technical features of the present disclosure can be applied.

The AI device 1900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 19, the AI device 1900 may include a communication part 1910, an input part 1920, a learning processor 1930, a sensing part 1940, an output part 1950, a memory 1960, and a processor 1970.

The communication part 1910 can transmit and/or receive data to and/or from external devices such as the AI devices and the AI server using wire and/or wireless communication technology. For example, the communication part 1910 can transmit and/or receive sensor information, a user input, a learning model, and a control signal with external devices. The communication technology used by the communication part 1910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1920 can acquire various kinds of data. The input part 1920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1920 can acquire input data to be used when acquiring an output using learning data and a learning model for model learning. The input part 1920 may obtain raw input data, in which case the processor 1970 or the learning processor 1930 may extract input features by preprocessing the input data.

The learning processor 1930 may learn a model composed of an ANN using learning data. The learned ANN can be referred to as a learning model. The learning model can be used to infer result values for new input data rather than learning data, and the inferred values can be used as a basis for determining which actions to perform. The learning processor 1930 may perform AI processing together with the learning processor of the AI server. The learning processor 1930 may include a memory integrated and/or implemented in the AI device 1900. Alternatively, the learning processor 1930 may be implemented using the memory 1960, an external memory directly coupled to the AI device 1900, and/or a memory maintained in an external device.

The sensing part 1940 may acquire at least one of internal information of the AI device 1900, environment information of the AI device 1900, and/or the user information using various sensors. The sensors included in the sensing part 1940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1950 may generate an output related to visual, auditory, tactile, etc. The output part 1950 may include a display unit for outputting visual information, a speaker for outputting auditory information, and/or a haptic module for outputting tactile information.

The memory 1960 may store data that supports various functions of the AI device 1900. For example, the memory 1960 may store input data acquired by the input part 1920, learning data, a learning model, a learning history, etc.

The processor 1970 may determine at least one executable operation of the AI device 1900 based on information determined and/or generated using a data analysis algorithm and/or a machine learning algorithm. The processor 1970 may then control the components of the AI device 1900 to perform the determined operation. The processor 1970 may request, retrieve, receive, and/or utilize data in the learning processor 1930 and/or the memory 1960, and may control the components of the AI device 1900 to execute the predicted operation and/or the operation determined to be desirable among the at least one executable operation. The processor 1970 may generate a control signal for controlling the external device, and may transmit the generated control signal to the external device, when the external device needs to be linked to perform the determined operation. The processor 1970 may obtain the intention information for the user input and determine the user's requirements based on the obtained intention information. The processor 1970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1930 and/or learned by the learning processor of the AI server, and/or learned by their distributed processing. The processor 1970 may collect history information including the operation contents of the AI device 1900 and/or the user's feedback on the operation, etc. The processor 1970 may store the collected history information in the memory 1960 and/or the learning processor 1930, and/or transmit to an external device such as the AI server. The collected history information can be used to update the learning model. The processor 1970 may control at least some of the components of AI device 1900 to drive an application program stored in memory 1960. Furthermore, the processor 1970 may operate two or more of the components included in the AI device 1900 in combination with each other for driving the application program.

Figure 20:
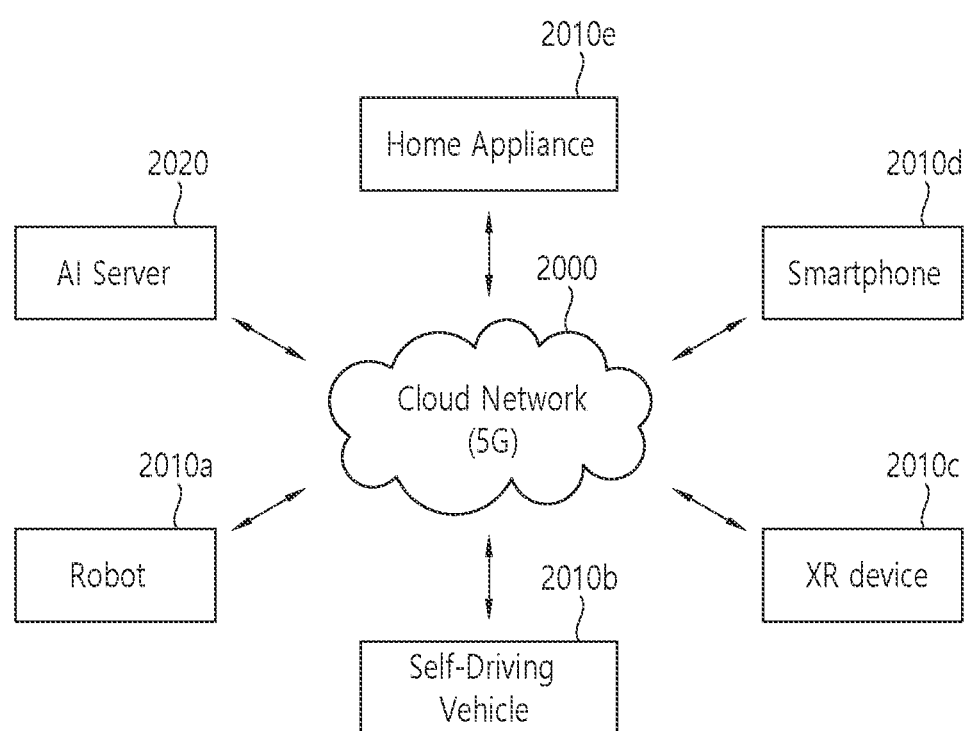
FIG. 20 shows an example of an AI system to which the technical features of the present disclosure can be applied.

FIG. 20 shows an example of an AI system to which the technical features of the present disclosure can be applied.

Referring to FIG. 20, in the AI system, at least one of an AI server 2020, a robot 2010*a*, an autonomous vehicle 2010*b*, an XR device 2010*c*, a smartphone 2010*d* and/or a home appliance 2010*e* is connected to a cloud network 2000. The robot 2010*a*, the autonomous vehicle 2010*b*, the XR device 2010*c*, the smartphone 2010*d*, and/or the home appliance 2010*e* to which the AI technology is applied may be referred to as AI devices 2010*a* to 2010*e*.

The cloud network 2000 may refer to a network that forms part of a cloud computing infrastructure and/or resides in a cloud computing infrastructure. The cloud network 2000 may be configured using a 3G network, a 4G or LTE network, and/or a 5G network. That is, each of the devices 2010*a* to 2010*e* and 2020 consisting the AI system may be connected to each other through the cloud network 2000. In particular, each of the devices 2010*a* to 2010*e* and 2020 may communicate with each other through a base station, but may directly communicate with each other without using a base station.

The AI server 2020 may include a server for performing AI processing and a server for performing operations on big data. The AI server 2020 is connected to at least one or more of AI devices constituting the AI system, i.e. the robot 2010*a*, the autonomous vehicle 2010*b*, the XR device 2010*c*, the smartphone 2010*d* and/or the home appliance 2010*e* through the cloud network 2000, and may assist at least some AI processing of the connected AI devices 2010*a* to 2010*e*. The AI server 2020 can learn the ANN according to the machine learning algorithm on behalf of the AI devices 2010*a* to 2010*e*, and can directly store the learning models and/or transmit them to the AI devices 2010*a* to 2010*e*. The AI server 2020 may receive the input data from the AI devices 2010*a* to 2010*e*, infer the result value with respect to the received input data using the learning model, generate a response and/or a control command based on the inferred result value, and transmit the generated data to the AI devices 2010*a* to 2010*e*. Alternatively, the AI devices 2010*a* to 2010*e* may directly infer a result value for the input data using a learning model, and generate a response and/or a control command based on the inferred result value.

Various embodiments of the AI devices 2010*a* to 2010*e* to which the technical features of the present disclosure can be applied will be described. The AI devices 2010*a* to 2010*e* shown in FIG. 20 can be seen as specific embodiments of the AI device 1900 shown in FIG. 19.

The present disclosure can have various advantageous effects.

For example, by performing a conditional mobility to a target cell in consideration of cell priority, UE can be served by a cell with high signal quality and high priority. Since the cell priority is related to UE's status or preference, the UE's status or preference can also be considered according to various embodiments of the present disclosure. Further, since a suitable cell with high signal quality and high priority is selected as a target cell for mobility, the rate of mobility failure or configuration failure can be reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
   receiving, from a network, conditional reconfiguration information,
   wherein the conditional reconfiguration information includes conditional mobility commands of candidate cells and execution conditions for the candidate cells;
   determining a first target cell from among the candidate cells for which an event associated to an execution condition is fulfilled;
   after determining the first target cell, starting a timer based on a priority of the first target cell which is not a highest priority,
   wherein the conditional reconfiguration information includes information related to the timer, and
   wherein a mobility to the first target cell is not triggered until the timer expires;
   while the timer is running, determining a second target cell from among the candidate cells for which an event associated to an execution condition is fulfilled and performing a mobility to the second target cell based on a mobility command of the second target cell, wherein a priority of the second target cell is higher than the priority of the first target cell; and
   upon expiry of the timer, performing a mobility to the first target cell based on a mobility command of the first target cell.

2. The method of claim 1, wherein the execution conditions for the candidate cells comprise the execution condition for the first target cell and the execution condition for the second target cell.

3. The method of claim 1,
   wherein the conditional reconfiguration information includes the priority of the first target cell and the priority of the second target cell.

4. The method of claim 1, further comprising:
   measuring a signal quality for each of the candidate cells; and
   determining a priority of each of the candidate cells based on the signal quality,
   wherein a signal quality for the second target cell is higher than a signal quality for the first target cell.

5. The method of claim 1, wherein the priority of the second target cell is highest among priorities of the candidate cells.

6. The method of claim 1, further comprising:
   receiving, from the network, a validity timer related to a time period during which the mobility commands are valid; and
   starting the validity timer upon receiving the mobility commands,
   wherein the timer runs while the validity timer is running.

7. The method of claim 1, further comprising:
   receiving, from the network, a scaling factor mapped to the priority of the second target cell;
   applying the scaling factor to the execution condition for the second target cell; and
   determining whether the second target cell satisfies the execution condition for the second target cell to which the scaling factor is applied based on a result of a measurement on the second target cell.

8. The method of claim 7, wherein the scaling factor is applied to at least one of:
   a first offset of the execution condition for the second target cell to obtain a second offset lower than the first offset;
   a first serving cell threshold of the execution condition for the second target cell to obtain a second serving cell threshold higher than the first serving cell threshold;
   a first neighbor cell threshold of the execution condition for the second target cell to obtain a second neighbor cell threshold lower than the first neighbor cell threshold; or
   a first time-to-trigger (TTT) value of the execution condition for the second target cell to obtain a second TTT value shorter than the first TTT value.

9. The method of claim 1, further comprising:
   receiving, from the network, an offset mapped to the priority of the second target cell;
   applying the offset to the execution condition for the second target cell; and determining whether the second target cell satisfies the execution condition for the second target cell to which the offset is applied based on a result of a measurement on the second target cell.

10. The method of claim 9, wherein the offset is applied to at least one of:
a first serving cell threshold of the execution condition for the second target cell to obtain a second serving cell threshold higher than the first serving cell threshold by the offset; or
a first neighbor cell threshold of the execution condition for the second target cell to obtain a second neighbor cell threshold lower than the first neighbor cell threshold by the offset.

11. The method of claim 1, further comprising:
transmitting, to the network, information regarding a service requested by the wireless device,
wherein the priority of the first target cell and the priority of the second target cell are determined based on the information regarding the service.

12. The method of claim 1, wherein the wireless device is in communication with at least one of a user equipment, a network, or autonomous vehicles other than the wireless device.

13. A wireless device configured to operate in a wireless communication system comprising:
a transceiver;
a memory storing instructions; and
at least one processor operatively coupled to the transceiver and the memory, and configured to execute the instructions to perform operations comprising:
receiving, from a network, conditional reconfiguration information,
wherein the conditional reconfiguration information includes conditional mobility commands of candidate cells and execution conditions for the candidate cells;
determining a first target cell from among the candidate cells for which an event associated to an execution condition is fulfilled;
after determining the first target cell, starting a timer based on a priority of the first target cell which is not a highest priority,
wherein the conditional reconfiguration information includes information related to the timer, and
wherein a mobility to the first target cell is not triggered until the timer expires;
while the timer is running, determining a second target cell from among the candidate cells for which an event associated to an execution condition is fulfilled and performing a mobility to the second target cell based on a mobility command of the second target cell, wherein a priority of the second target cell is higher than the priority of the first target cell; and
upon expiry of the timer, perform a mobility to the first target cell based on a mobility command of the first target cell.

14. A non-transitory computer-readable medium having recorded thereon a program for performing each step of a method on a computer, the method comprising:
receiving, from a network, conditional reconfiguration information,
wherein the conditional reconfiguration information includes conditional mobility commands of candidate cells and execution conditions for the candidate cells;
determining a first target cell from among the candidate cells for which an event associated to an execution condition is fulfilled;
after determining the first target cell, starting a timer based on a priority of the first target cell which is not a highest priority,
wherein the conditional reconfiguration information includes information related to the timer, and
wherein a mobility to the first target cell is not triggered until the timer expires;
while the timer is running, determining a second target cell from among the candidate cells for which an event associated to an execution condition is fulfilled and performing a mobility to the second target cell based on a mobility command of the second target cell, wherein a priority of the second target cell is higher than the priority of the first target cell; and
upon expiry of the timer, performing a mobility to the first target cell based on a mobility command of the first target cell.

* * * * *